United States Patent
Ng et al.

(10) Patent No.: US 11,150,486 B2
(45) Date of Patent: Oct. 19, 2021

(54) METHOD AND SYSTEM FOR OBJECT RIPPLING IN A DISPLAY SYSTEM INCLUDING MULTIPLE DISPLAYS

(71) Applicant: Pure Depth Inc., Auckland (NZ)

(72) Inventors: Sok-Mung Ng, Auckland (NZ); Austin F. O'Brien, Auckland (NZ)

(73) Assignee: PURE DEPTH INC., Auckland (NZ)

( * ) Notice: Subject to any disclaimer, the term of this patent is extended or adjusted under 35 U.S.C. 154(b) by 211 days.

(21) Appl. No.: 15/896,739

(22) Filed: Feb. 14, 2018

(65) Prior Publication Data

US 2018/0231789 A1    Aug. 16, 2018

Related U.S. Application Data

(60) Provisional application No. 62/459,168, filed on Feb. 15, 2017.

(51) Int. Cl.
*G02B 30/24* (2020.01)
*G06F 3/041* (2006.01)
(Continued)

(52) U.S. Cl.
CPC ........... *G02B 30/24* (2020.01); *G06F 3/0412* (2013.01); *G09G 3/003* (2013.01); *G02B 30/52* (2020.01);
(Continued)

(58) Field of Classification Search
CPC ............... G02B 27/2264; G09G 3/003; G09G 2340/14; G09G 2300/023; G09G 3/36;
(Continued)

(56) References Cited

U.S. PATENT DOCUMENTS 5,745,197 A * 4/1998 Leung ................. G02F 1/13471
349/77
8,100,539 B2 * 1/2012 Tseng ....................... G09G 3/20
353/78
(Continued)

OTHER PUBLICATIONS

European Extended Search Report dated Oct. 19, 2020 for EP Application No. 18755062.9.
(Continued)

*Primary Examiner* — Patrick N Edouard
*Assistant Examiner* — Douglas M Wilson
(74) *Attorney, Agent, or Firm* — Nixon & Vanderhye P.C.

(57) ABSTRACT

An instrument panel may include a multi-layer display including a first display panel and second display panel arranged in a substantially parallel manner, a backlight configured to provide light to the first display panel and the second display panel of the multi-layer display system, and a processing system comprising at least one processor and memory. The processing system may be configured to: display content including an object on a first display panel; divide the object into a plurality of segments; assign to each divided segment a position in a time sequence; and responsive to instructions, display, on the second display panel, segments corresponding to the segments of the object displayed on the first display panel, wherein the segments displayed on the first and second display panel are animated by varying optical properties of each segment according to the positions assigned the segments in the time sequence.

17 Claims, 17 Drawing Sheets

(51) Int. Cl.
*G09G 3/00* (2006.01)
*G06F 3/14* (2006.01)
*G09G 3/36* (2006.01)
*G02B 30/52* (2020.01)
*G09G 3/26* (2006.01)
*H04N 13/398* (2018.01)

(52) U.S. Cl.
CPC ........... *G06F 3/1423* (2013.01); *G09G 3/004* (2013.01); *G09G 3/26* (2013.01); *G09G 3/36* (2013.01); *G09G 2300/023* (2013.01); *G09G 2320/0261* (2013.01); *G09G 2340/14* (2013.01); *G09G 2380/10* (2013.01); *H04N 13/398* (2018.05)

(58) Field of Classification Search
CPC .. G09G 2380/10; G06F 3/0412; G06F 3/1423
See application file for complete search history.

(56) References Cited

U.S. PATENT DOCUMENTS

| | | |
|---|---|---|
| 2002/0105516 A1 | 8/2002 | Tracy |
| 2002/0113752 A1 | 8/2002 | Sullivan et al. |
| 2005/0134607 A1 | 6/2005 | Purdy |
| 2010/0201623 A1* | 8/2010 | Engel .................. H04N 13/279 345/161 |
| 2011/0249026 A1* | 10/2011 | Singh .................... G09G 3/003 345/630 |
| 2014/0267303 A1* | 9/2014 | Larkin ................... G06T 15/00 345/473 |
| 2014/0333511 A1 | 11/2014 | Nagahashi et al. |
| 2016/0187666 A1 | 6/2016 | Manns et al. |
| 2017/0031162 A1 | 2/2017 | Konishi et al. |
| 2017/0132961 A1* | 5/2017 | Nagahashi ........... G09G 3/3607 |
| 2018/0118224 A1* | 5/2018 | Arita ....................... B60Q 1/24 |
| 2018/0182304 A1* | 6/2018 | Lee ...................... G09G 3/3607 |

OTHER PUBLICATIONS

Chinese Office Action dated Jan. 27, 2021 for CN Application No. 201880024972.0.

* cited by examiner

TIME    Sequence = {2, 3, 4, 5, 1}

0

Front Layer = Opaque

1

Back Layer = Opaque

2

3

4

5

TIME            Sequence = {3, 2 & 4, 1 & 5}

0      Front Layer = Opaque

1      Back Layer = Opaque

2

3

TIME    Sequence = {1 & 2 & 3, 4, 5, 1, 2 }

0   Front Layer = Opaque

1   Back Layer = Opaque

2

3

4

Sequence = {5, 2 & 4 & 6 & 8, 1 & 3 & 7 & 9}

TIME

0

Front Layer = Opaque

Back Layer = Opaque

1

2

3

METHOD AND SYSTEM FOR OBJECT RIPPLING IN A DISPLAY SYSTEM INCLUDING MULTIPLE DISPLAYS

CROSS REFERENCE TO RELATED APPLICATIONS

This application claims the benefit of priority to U.S. Provisional Patent Application No. 62/459,168 filed on Feb. 15, 2017, the entire contents of which is hereby incorporated by reference.

RELATED APPLICATIONS

The object rippling techniques described herein may be used in any multi-display system (MLD), including but not limited to in any of the multi-display systems described in any of U.S. patent application Ser. Nos. 14/986,158; 14/855,822; 14/632,999; 15/338,777; 15/283,525; 15/283,621; 15/281,381; 15/409,711; 15/393,297; 15/378,466; 15/359,732; 15/391,903, all of which are hereby incorporated herein by reference in their entireties.

FIELD OF THE INVENTION

This invention relates to a multi-display system (e.g., a display including multiple display panels/display layers), where at least first and second displays (e.g., display panels or display layers) are arranged substantially parallel to each other in order to display three-dimensional (3D) features to a viewer(s). Thus, this invention relates generally to displays and, more particularly, to display systems and methods for displaying three-dimensional features.

BACKGROUND

Traditionally, displays present information in two dimensions. Images displayed by such displays are planar images that lack depth information. Because people observe the world in three-dimensions, there have been efforts to provide displays that can display objects in three-dimensions. For example, stereo displays convey depth information by displaying offset images that are displayed separately to the left and right eye. When an observer views these planar images they are combined in the brain to give a perception of depth. However, such systems are complex and require increased resolution and processor computation power to provide a realistic perception of the displayed objects.

When working on MLD systems, it is often difficult to give the illusion of objects transitioning between layers in time, as objects are usually bound to a singular layer. According to example embodiments of this invention, object rippling is a technique by which a stacked series of discrete display planes (MLD) can imply a continuous slope of motion away from, or towards, the viewer via transitioning segments of planar regions across depth planes.

SUMMARY

Exemplary embodiments of this disclosure provide a display system that can display content on different display screens of a multi-layer display provided in a stacked arrangement. The multi-layer display system may include a plurality of display panels arranged in an overlapping manner, a backlight configured to provide light to the plurality of display panels, and a processing system. Each of the display panels may include an array of pixels. The processing system may be configured to control the display of content on the plurality of display panels. The processing system may be configured to control the transition of content between the plurality of display panels.

According to one exemplary embodiment, an instrument panel comprises a multi-layer display including a first display panel and second display panel arranged in a substantially parallel manner, the front display panel and the rear display panel including an array of pixels and the second display panel overlapping the first display panel; a backlight configured to provide light to the first display panel and the second display panel of the multi-layer display system; and a processing system comprising at least one processor and memory. The processing system configured to: display content including an object on a first display panel; divide the object into a plurality of segments; assign to each divided segment a position in a time sequence; and responsive to instructions, display, on the second display panel, segments corresponding to the segments of the object displayed on the first display panel, wherein the segments displayed on the first and second display panel are animated by varying optical properties of each segment according to the positions assigned the segments in the time sequence.

In another exemplary embodiment, the segments of the object displayed on the first display panel and corresponding segments displayed on the second panel appear to have the same shape and size.

In another exemplary embodiment, varying the optical properties of the segments displayed on the first display panel includes reducing the opacity of the segments displayed on the first display panel, and varying the optical properties of the segments displayed on the second display panel includes increasing the opacity of the segments displayed on the second display panel.

In another exemplary embodiment, varying the optical properties of the segments displayed on the first display panel includes gradually decreasing the visibility of the segments displayed on the first display panel, and varying the optical properties of the segments displayed on the second display panel includes gradually increasing the visibility of the segments displayed on the second display panel.

In another exemplary embodiment, the first display panel is a touch sensitive display, and the processing system is configured to detect whether a touch input is performed to a portion of the first display panel displaying the object, and upon determining that the input is performed, provide instructions to start displaying the segments on the second display panel according to the position in the time sequence assigned to corresponding segments displayed on the first display panel.

In another exemplary embodiment, a multi-layer display system comprising: a first display panel and second display panel arranged in a substantially parallel manner, the second display panel overlapping the first display panel; a backlight configured to provide light to the first display panel and the second display panel of the multi-layer display system; and a processing system comprising at least one processor and memory. The processing system is configured to: display a first object on a first display panel, the first object divided into a plurality of segments, each segment assigned a position in a time sequence; responsive to instructions, display a second object on the second display panel, the second object including a plurality of segments corresponding to the segments of the first object, wherein the segments of the first object and segments of the second object are animated by varying optical properties of each segment on the first display panel and the second display panel according to times assigned to the segments of the first object in the time sequence, wherein such times assigned are dependent on adjacency matrices.

In another exemplary embodiment, the first object and the second object have the same shape and size.

In another exemplary embodiment, the segments of the first object are removed from being displayed on the first display panel according to the time assigned in the time sequence to each segment of the first object, and the segments of the second object are added to being displayed on the second display panel according to the time assigned in the time sequence assigned to each segment of the second object.

In another exemplary embodiment, for each segment of the first object removed from being displayed on the first display panel, a corresponding segment of the second object is displayed on the second display panel.

In another exemplary embodiment, the segments of the first object are removed from being displayed on the first display panel by reducing the opacity of the segments of the first object, and the segments of the second object are displayed on the second display panel by increasing the opacity of the segments of the second object.

In another exemplary embodiment, the first display panel is a touch sensitive display, and the processing system is configured to detect whether a touch input is performed to a portion of the first display panel displaying the first object, and upon determining that the input is performed to the portion of the first display panel displaying the first object, provide instructions to display the second object on the second display panel.

In another exemplary embodiment, the first object and the second object indicate a distance between two vehicles.

In another exemplary embodiment, the segments of the first object are separated by gaps between the segments.

In another exemplary embodiment, the segments of the first object form a continuous object.

In another exemplary embodiment, a display system comprises: a multi-layer display including a plurality of display panels arranged in a substantially parallel manner, each display panel including an array of pixels; a backlight configured to provide light to the plurality of display panels; and a processing system comprising at least one processor and memory. The processing system is configured to: divide an object for display on the display panels into a plurality of segments; assign to each divided segment a position in a time sequence; control a first panel of the plurality of display panels to display the object including the plurality of segments; and control the plurality of display panels to move the segments from the first display panel to a second panel of the plurality of display panels via one or more other display panels of the plurality of display panels disposed between the first display panel and the second display panel.

In another exemplary embodiment, a method is provided for displaying content on a multi-layer display system including at least first display panel and second display panel arranged in a substantially parallel and overlapping manner. The method comprises: displaying a first object on a first display panel, the first object divided into a plurality of segments, each segment assigned a position in a time sequence; responsive to instructions, display a second object on the second display panel, the second object including a plurality of segments corresponding to the segments of the first object, wherein the segments of the first object and segments of the second object are animated by varying optical properties of each segment on the first display panel and the second display panel according to times assigned to the segments of the first object in the time sequence.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Embodiments of this disclosure provide for using a multi-layer display system (MLD) including a plurality of display panels, with each display panel including a plurality of liquid crystal display cells. Content (e.g., graphics, texts etc.) is displayed simultaneously on a plurality of the panels to simulate three dimensional features. In some examples, portions of displayed content may transition from one display screen to another display screen over time. To simulate a continuous slope of motion away from, or towards, a viewer content displayed on one of the screens may be divided into segments, assign each segment a position in a time sequence, and animate the segments by varying optical properties of each of the segments on each depth layer at the time specified by the sequence.

According to example embodiments of this invention, object rippling is a technique by which a stacked series of discrete display planes (MLD) can imply a continuous slope of motion away from, or towards, the viewer via transitioning segments of planar regions across depth planes. Embodiments of this disclosure provide for a more flexible way, not just to display content with a perception of three dimensions, but to also display the content in a manner that provides a perception of the content being moved between a plurality of planes. Embodiments of this disclosure provide for content to be easily moved between the plurality of planes with simplicity and without complex graphics processing. Furthermore, the embodiments of this disclosure provide a particular manner of processing content for display and particular manner of presenting the content in a multi-layer display system.

Figure 1:
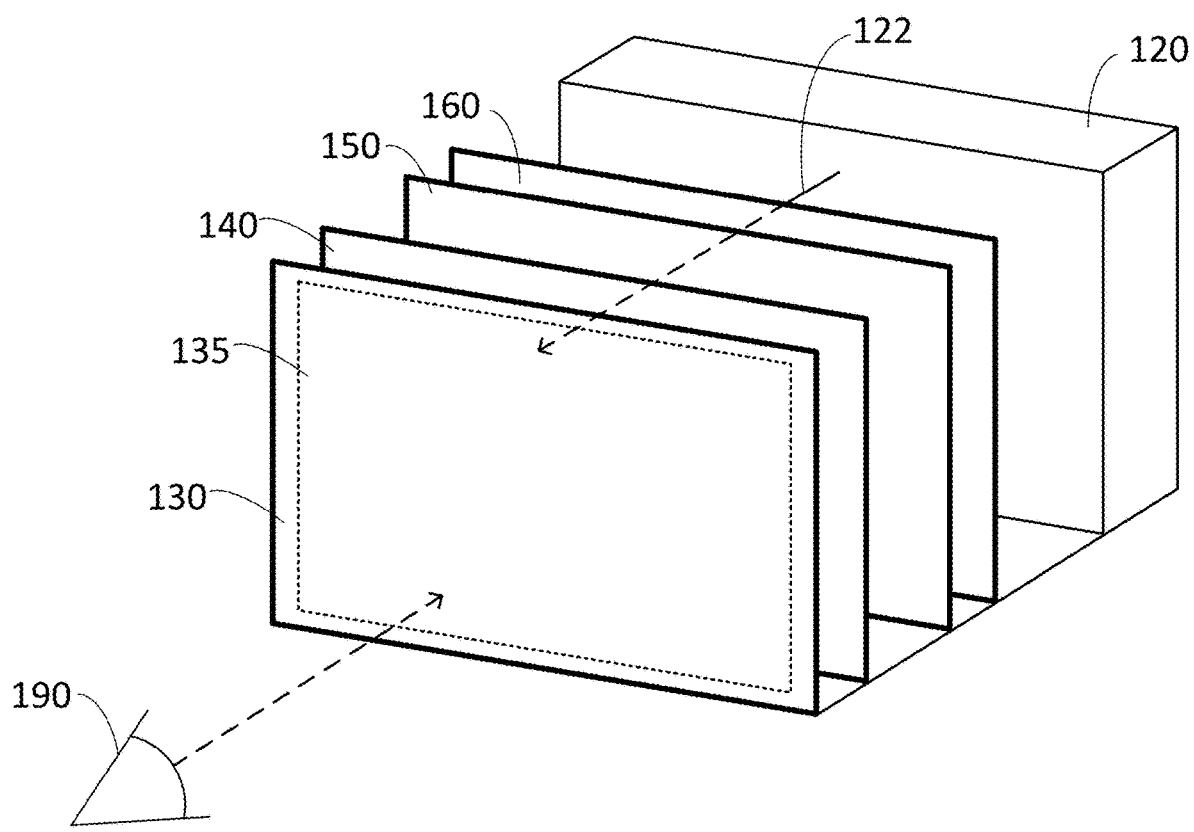
FIG. 1 illustrates a multi-layer display system according to an embodiment of the present disclosure.

FIG. 1 illustrates a multi-layer display system 100 according to an embodiment of the present disclosure. The display system 100 may include a light source 120 (e.g., rear mounted light source, side mounted light source, optionally with a light guide), and a plurality of display screens 130-160. Each of the display screens 130-160 may include multi-domain liquid crystal display cells. One or more of the display screens 130-160 may include a black mask defining the visible parts of the liquid crystal display cells. One or more of the display screens 130-160 may be provided without a black mask.

The display screens 130-160 may be disposed substantially parallel or parallel to each other and/or a surface (e.g., light guide) of the light source 120 in an overlapping manner In one embodiment, the light source 120 and the display screens 130-160 may be disposed in a common housing. The display apparatus 100 may be provided in an instrument panel installed in a dashboard of a vehicle. The instrument panel may be configured to display information to an occupant of the vehicle via one or more displays 130-160 and/or one or more mechanical indicators provided in the instrument panel. One or more of the mechanical indicators may be disposed between the displays 130-160. The displayed information using the displays 130-160 and/or the mechanical indicators may include vehicle speed, engine coolant temperature, oil pressure, fuel level, charge level, and navigation information, but is not so limited. It should be appreciated that the elements illustrated in the figures are not drawn to scale, and thus, may comprise different shapes, sizes, etc. in other embodiments.

The light source 120 may be configured to provide illumination for the display system 100. The light source 120 may provide substantially collimated light 122 that is transmitted through the display screens 130-160.

Optionally, the light source 120 may provide highly collimated light using high brightness LED's that provide for a near point source. The LED point sources may include pre-collimating optics providing a sharply defined and/or evenly illuminated reflection from their emission areas. The light source 120 may include reflective collimated surfaces such as parabolic mirrors and/or parabolic concentrators. In one embodiment, the light source 120 may include refractive surfaces such as convex lenses in front of the point source. However, the LEDs may be edge mounted and direct light through a light guide which in turn directs the light toward the display panels in certain example embodiments. The light source 120 may comprise a plurality of light sources, with each light source providing backlight to a different region of the display screens 130-160. In one embodiment, the light source 120 may be configured to individual provide and control light for each pixels of a panel in front of the light source 120.

Each of the display panels/screens 130-160 may include a liquid crystal display (LCD) matrix. Alternatively, one or more of the display screens 130-160 may include organic light emitting diode (OLED) displays, transparent light emitting diode (TOLED) displays, cathode ray tube (CRT) displays, field emission displays (FEDs), field sequential display or projection displays. In one embodiment, the display panels 130-160 may be combinations of either full color RGB, RGBW or monochrome panels. Accordingly, one or more of the display panels may be RGB panels, one or more of the display panels may be RGBW panels and/or one or more of the display panels may be monochrome panels. One or more of the display panels may include passive white (W) sub-pixels. The display screens 130-160 are not limited to the listed display technologies and may include other display technologies that allow for the projection of light. In one embodiment, the light may be provided by a projection type system including a light source and one or more lenses and/or a transmissive or reflective LCD matrix. The display screens 130-160 may include a multi-layer display unit including multiple stacked or overlapped display layers each configured to render display elements thereon for viewing through the uppermost display layer.

In one embodiment, each of the display screens 130-160 may be approximately the same size and have a planar surface that is parallel or substantially parallel to one another. In other embodiments, the displays screens may be of difference size (e.g., a front display may be smaller than one or more of the displays it overlaps). In another embodiment, one or more of the display screens 130-160 may have a curved surface. In one embodiment, one or more of the display screens 130-160 may be displaced from the other display screens such that a portion of the display screen is not overlapped and/or is not overlapping another display screen.

Each of the display screens 130-160 may be displaced an equal distance from each other in example embodiments. In another embodiment, the display screens 130-160 may be provided at different distances from each other. For example, a second display screen 140 may be displaced from the first display screen 130 a first distance, and a third display screen 150 may be displaced from the second display screen 140 a second distance that is greater than the first distance. The fourth display screen 160 may be displaced from the third display screen 150 a third distance that is equal to the first distance, equal to the second distance, or different from the first and second distances.

The display screens 130-160 may be configured to display graphical information for viewing by the observer 190. The viewer/observer 190 may be, for example, a human operator or passenger of a vehicle, or an electrical and/or mechanical optical reception device (e.g., a still image, a moving-image camera, etc.). Graphical information may include visual display content (e.g., objects and/or texts). The display screens 130-160 may be controlled to display content simultaneously on different display screens 130-160. At least a portion of content displayed on one of the display screens 130-160 may overlap content displayed on another one of the display screens 130-160.

In one embodiment, the graphical information may include displaying images or a sequence of images to provide video or animations. In one embodiment, displaying the graphical information may include moving objects and/or text across the screen or changing or providing animations to the objects and/or text. The animations may include changing the color, shape and/or size of the objects or text. In one embodiment, displayed objects and/or text may be moved between the display screens 130-160. In moving the content between the display screens 130-160, content displayed on one of the screen may be divided into segments, the segments assigned a position in a time sequence, and the segments may be animated by varying optical properties of each segment on each of the display screens at a time specified by the time sequence. In some embodiments, content may be moved over more than two screens. The distances between the display screens 130-160 may be set to obtain a desired depth perception between features displayed on the display screens 130-160.

In one embodiment, a position of one or more of the display screens 130-160 may be adjustable by an observer 190 in response to an input. Thus, an observer 190 may be able to adjust the three dimension depth of the displayed objects due to the displacement of the display screens 130-160. A processing system may be configured to adjust the displayed graphics and gradients associated with the graphics in accordance with the adjustment.

Each of the display screens 130-160 may be configured to receive data and display, based on the data, a different image on each of the display screens 130-160 simultaneously. Because the images are separated by a physical separation due to the separation of the display screens 130-160, each image is provided at a different focal plane and depth is perceived by the observer 190 in the displayed images. The images may include graphics in different portions of the respective display screen.

While not illustrated in FIG. 1, the display system 100 may include one or more projection screens, one or more diffraction elements, and/or one or more filters between an observer 190 and the projection screen 160, between any two display screens 130-160, and/or the display screen 130 and the light source 120.

The display system 100 may include a touch sensitive display surface 135 provided in front of or as part of the front display 130. A processing system may be configured to detect whether a touch input is performed to a portion of the front display displaying the one or more objects, and/or display content based on the touch input(s).

One or more of the display screens 130-160 may be in-plane switching mode liquid crystal display devices (IPS-LCDs). The IPS-LCD may be a crossed polarizer type with a polarizer on one side of the cells being perpendicular to a polarizer on an opposite side of the cells (i.e., transmission directions of the polarizers are placed at right angles). In one embodiment, a pair of crossed polarized layers may be provided with a first polarizer layer provided in front of the display screen 130 and a second polarizer layer provided behind the display screen 160.

Figure 2:
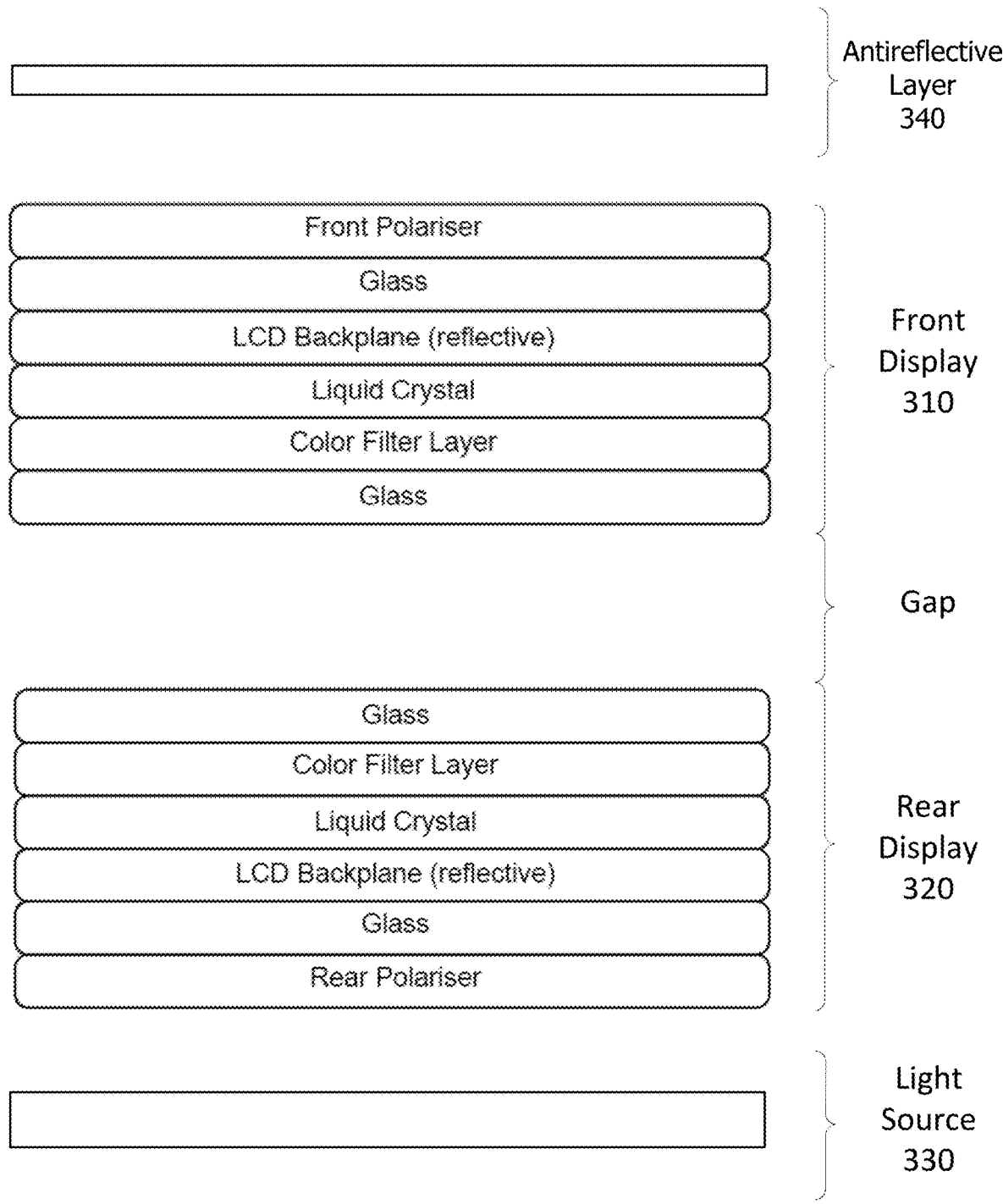
FIG. 2 illustrates an MLD according to an example embodiment of this invention, in which the stacked overlapping layers/displays of any of the figures herein may be provided and utilized.

FIG. 2 illustrates a MLD according to an example embodiment of this invention, in which the stacked overlapping layers/displays of any of the figures herein may be provided and utilized. For example, the display screens 130 and 160 (shown in FIG. 1) may correspond the front display 210 and rear display 220 in FIG. 2, respectively.

The front display 210 may be a display that is closest to an observer. The rear display 220 may be a display that is closest to a light source 230 (e.g., backlight) of the MLD. While not illustrated in FIG. 2, one or more other components such as display layer(s), filter(s), and/or filler(s) may be provided in the gap between the front display 210 and the rear display 220.

The MLD includes a crossed polarizer type configuration with a polarizer on one side of the displays being perpendicular to a polarizer on an opposite side of the displays (i.e., transmission directions of the polarizers are placed at right angles). As shown in FIG. 2, a front polarizer is provided on the front of the front display 210 and a rear polarizer is provided on a back surface of the rear display 220. In one embodiment, the MLD may include only two polarizers provided between a plurality of overlapping liquid crystal layers of the displays 210 and 220 and any other liquid crystal layers provided in the gap.

Other polarizers may optionally be provided as part of an antireflective layer 240 (e.g., provided in front of the front display 210) to reduce external reflections of ambient light. The antireflective layer 240 may include a quarter wave retarder and/or an antireflective (AR) polarizer. Additionally, black mask (BM) or other non-reflective material may be added behind the conductive traces of the displays to reduce reflections. Additionally, antireflective (AR) coating(s) may be applied to the interior surfaces in certain example embodiments. The AR coating may, for example, operate in the visible range, e.g., moth eye, single layer interference, multi-layer interference, etc.

Gaps between the displays may be designed to include air or material having birefringence designed to maintain black state of the display when desired. The gap may include material having a refractive index matched closely to glass or the layers on either side to reduce internal reflection and/or depolarization effects. For the front display 210, its backplane may be oriented opposite to that of display 220. In particular, for the front display 210 its backplane may be oriented to face the viewer to reduce internal reflections.

As illustrated in FIG. 2, accordingly to one embodiment, the color filter layers (each of which may be made up of one or more layers) of the respective displays may be designed to face each other, with no liquid crystal layer from either display being located between the color filter layers of the first and second displays in certain example embodiments. The position of the color filter layers is not limited to the illustration in FIG. 2 and may be provided in other positions of the respective display. For example, the color filter of the front display 210 may be provided between the glass and the liquid crystal of the front display 210.

The displays may be comprised of pixels arranged in a matrix using an RGB (Red, Green, Blue) wavelength distribution. In this configuration, each pixel group is provided with Red, Green, and Blue colors. A given pixel provides one color image by mixing the red, green and blue light generated from the respective sub-pixels of the pixel. A back light generates light for the pixel, but the RGB pixel transmits only a portion of the light provided by the back light (e.g., 30% of the provided light). In some embodiments, one or more pixel groups may be provided with a liquid crystal without a color filter to provide a white pixel. The white pixel may be a passive pixel.

The color filter layer in one or more of the displays may include a black mask. The black mask may be opaque and define, at each pixel, apertures through which the liquid crystal pixels are visible. Light is transmitted and/or reflected through the apertures defined by the mask. The black mask may hide portions of the display(s) around the pixels and parts of the pixels where visible artifacts occur (e.g., fringing fields created between and/or at the edges of addressing electrodes of the pixels). The black mask may reduce the ambient light reflections from reflective gate and data lines of the display and be provided over transistors, glass spaces, and/or indium tin oxide (ITO) via connections. To improve the gain in transmission of the MLD system, one or more displays may be provided with a black mask that is reduced or without a black mask.

FIGS. 3A-3F illustrate example embodiments of object rippling on multiple screens of an MLD system. By utilizing object rippling, users can infer motion of individual segments across planes, which over a time sequence, achieves the illusion of whole regions gradually transitioning across layers of the MLD.

Figure 3A:
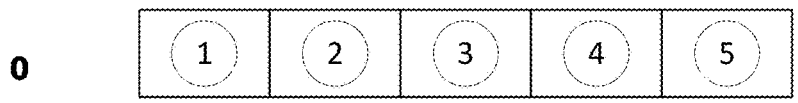
FIGS. 3A-3F illustrate example embodiments of object rippling on multiple screens of an MLD system.
Figure 3A:
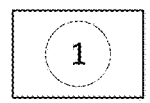
Figure 3A:
Figure 3A:
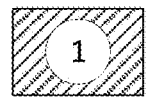
Figure 3A:
Figure 3A:
Figure 3A:
Figure 3A:

In FIG. 3A, a plurality of segments 1-5 of an object or region are shown to transition between a back layer and a front layer according to a time sequence. The content displayed on one of the layers may be a continuous object or region. Portions of the object or region may be transparent. The object or region is divided into individual segments. The surface from which the segments are derived may be a continuous surface, however it may be transparent and/or may include transparent portions. As illustrated in FIG. 3A, the object or region may be divided into segments 1-5. While the segments in FIG. 3A are illustrated as being of the same shape and size, embodiments of this disclosure are not so limited. In some embodiments, one or more of the segments may have a different shape and/or size from the other segments. Having difference sizes and/or shapeson difference screens may help to relay the depth motion between the screens in a more realistic manner. For example the size of the segments may increase as the segments transition towards a viewer. In one embodiment, the segments may be separated by gaps (not illustrated in FIG. 3A).

Each of the segments 1-5 may be assigned a position in a time sequence. As illustrated in FIG. 3A, segment 2 is assigned time position 1 of the time sequence, segment 3 is assigned time position 2 of the time sequence, segment 4 is assigned time position 3 of the time sequence, segment 5 is assigned time position 4 of the time sequence, and segment 1 is assigned time position 5 of the time sequence. In some embodiments, the time position of the segments may be set such that adjacent segments are set to sequential time positions. In other embodiments, segments that are not adjacent (e.g., segments 1 and 5) may be set to sequential time positions of the time sequence.

The segments 1-5 may be animated by varying optical properties of each segment on both display layers according to a time specified for the respective segment by the time sequence. At time position 0, segments 1-5 may be set to be opaque on the front layer. At time position 0, segments 1-5 may not be displayed on the front layer. At this time, the segments 1-5 on the back layer may be set to be transparent.

At time 1, segments 1 and 3-4 may continue to be set to be opaque on the front layer and segment 2 may be set to be transparent on the front layer. At this time, segment 2 may be set to opaque on the back layer.

At time 2, segments 1, 4, and 5 may continue to be set to be opaque on the front layer and segments 2 and 3 may be set to be transparent on the front layer. At this time, segments 2 and 3 may be set to opaque on the back layer.

At time 3, segments 1 and 5 may continue to be set to be opaque on the front layer and segments 2-4 may be set to be transparent on the front layer. At this time, segments 2-4 may be set to opaque on the back layer.

At time 4, segment 1 may continue to be set to be opaque on the front layer and segments 2-5 may be set to be transparent on the front layer. At this time, segments 2-5 may be set to opaque on the back layer.

At time 5, segments 1-5 may be set to be transparent on the front layer. At this time, segments 1-5 may be set to opaque on the back layer.

As illustrated in FIG. 3A, at each time point in the time sequence, an additional segment may transition from being displayed on the front layer to being displayed on the back layer by controlling the opacity of the segments. In some example, the opacity may be gradually changed on each of the layers between time points in the time sequence. For example, of segment 2 on the front layer may be gradually reduced between times 0 and 1, and the opacity of segment 2 on the back layer may be gradually increased between time 0 and 1. The opacity may be changed linearly in the time period between two time points of the sequence or exponentially.

Figure 3B:
Figure 3B:
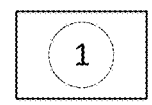
Figure 3B:
Figure 3B:
Figure 3B:
Figure 3B:

FIG. 3B illustrates an example embodiment of bi-directional depth rippling on two screens of an MLD system. In FIG. 3B, a plurality of segments 1-5 of an object or region are shown to transition between a back layer and a front layer according to a time sequence. As illustrated in FIG. 3B, the object or region may be divided into segments 1-5.

Each of the segments 1-5 may be assigned a position in a time sequence. As illustrated in FIG. 3B, segment 3 is assigned time position 1 of the time sequence, segments 2 and 4 are assigned time position 2 of the time sequence, and segments 1 and 5 are assigned time position 3 of the time sequence.

The segments 1-5 may be animated by varying optical properties of each segment on both display layers according to a time specified for the respective segment by the time sequence. At time position 0, segments 1-5 may be set to be opaque on the front layer. At time position 0, segments 1-5 may not be displayed on the front layer. At this time, the segments 1-5 on the back layer may be set to be transparent.

At time 1, segments 1, 2, 4 and 5 may continue to be set to be opaque on the front layer and segment 3 may be set to be transparent on the front layer. At this time, segment 3 may be set to opaque on the back layer.

At time 2, segments 1 and 5 may continue to be set to be opaque on the front layer and segments 2 and 4 may be set to be transparent on the front layer. At this time, segments 2 and 4 may be set to opaque on the back layer.

At time 3, segments 1 and 5 may be set to be transparent on the front layer, and segments 1 and 5 may be set to opaque on the back layer.

As illustrated in FIG. 3B, at each time point in the time sequence, additional segments may transition from being displayed on the front layer to being displayed on the back layer by controlling the opacity of the segments. The rippling illustrated in FIG. 3B starts at a specific location of the object (i.e., segment 3) and expands in two opposite directions. In some examples, the depth rippling may expand in more than two directions from a specific location of the object. In some example, the opacity may be gradually changed on each of the layers between time points in the time sequence.

Figure 3C:
Figure 3C:
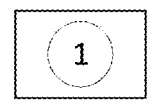
Figure 3C:
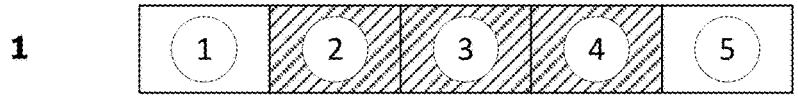
Figure 3C:
Figure 3C:
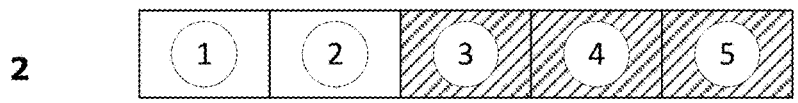
Figure 3C:
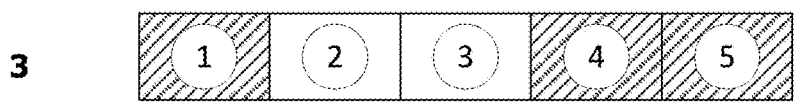
Figure 3C:

FIG. 3C illustrates an example embodiment repeated depth rippling on two screens of an MLD system. In FIG. 3C, a plurality of segments 1-5 of an object or region are shown to transition repeatedly between a back layer and a front layer according to a time sequence. As illustrated in FIG. 3C, the object or region may be divided into segments 1-5.

Each of the segments 1-5 may be assigned a position in a time sequence. As illustrated in FIG. 3B, segments 1-3 are assigned time position 0 of the time sequence, segment 4 is assigned time position 1 of the time sequence, segment 5 is assigned time position 2 of the time sequence, segment 1 is assigned time position 3 of the time sequence, and segment 2 is assigned time position 4 of the time sequence.

The segments 1-5 may be animated by varying optical properties of each segment on both display layers according to a time specified for the respective segment by the time sequence. At time position 0, segments 1-3 may be set to be opaque on the back layer and segments 4 and 5 may be set to be transparent on the back layer. At this time, segments 1-3 may be set to be transparent on the front layer and segments 4 and 5 may be set to be opaque on the front layer.

At time position 1, segments 2-4 may be set to be opaque on the back layer and segments 1 and 5 may be set to be transparent on the back layer. At this time, segments 2-4 may be set to be transparent on the front layer and segments 1 and 5 may be set to be opaque on the front layer.

At time position 2, segments 3-5 may be set to be opaque on the back layer and segments 1 and 2 may be set to be transparent on the back layer. At this time, segments 3-5 may be set to be transparent on the front layer and segments 1 and 2 may be set to be opaque on the front layer.

At time position 3, segments 1, 4, and 5 may be set to be opaque on the back layer and segments 2 and 3 may be set to be transparent on the back layer. At this time, segments 1, 4, and 5 may be set to be transparent on the front layer and segments 2 and 3 may be set to be opaque on the front layer.

At time position 4, segments 1, 2, and 5 may be set to be opaque on the back layer and segments 3 and 4 may be set to be transparent on the back layer. At this time, segments 1, 2, and 5 may be set to be transparent on the front layer and segments 3 and 4 may be set to be opaque on the front layer.

This sequence and control of the segments which are opaque and transparent may be continued to provide an effect of repeated depth rippling.

Figure 3D:
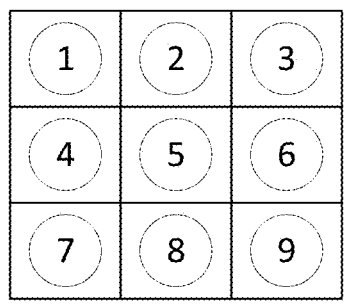
Figure 3D:
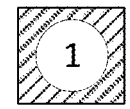
Figure 3D:
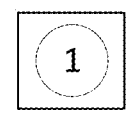
Figure 3D:
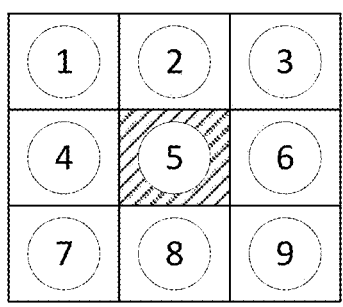
Figure 3D:
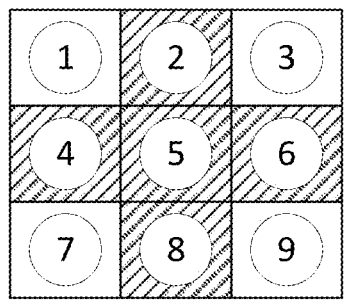
Figure 3D:
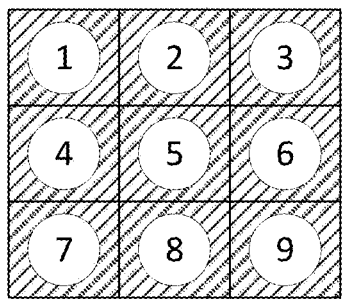

FIG. 3D illustrates an example embodiment of two dimensional depth rippling on two screens of an MLD system. As illustrated in FIG. 3D, the object or region may be divided into segments 1-D. In FIG. 3D, a plurality of segments 1-9 of an object or region are shown to transition between a back layer and a front layer according to a time sequence.

Each of the segments 1-9 may be assigned a position in a time sequence. As illustrated in FIG. 3B, segment 5 is assigned time position 1 of the time sequence, segments 2, 4, 6, and 8 are assigned time position 2 of the time sequence, and segments 1, 3, 7 and 9 are assigned time position 3 of the time sequence.

The segments 1-9 may be animated by varying optical properties of each segment on both display layers according to a time specified for the respective segment by the time sequence. At time position 0, segments 1-9 may be set to be opaque on the back layer. At time position 0, segments 1-9 may not be displayed on the front layer. At this time, the segments 1-9 on the front layer may be set to be transparent.

At time 1, segments 1-4 and 6-9 may continue to be set to be opaque on the back layer and segment 5 may be set to be transparent on the back layer. At this time, segment 5 may be set to opaque on the front layer.

At time 2, segments 1, 3, 7 and 9 may continue to be set to be opaque on the back layer and segments 2, 4, 6, and 8 may be set to be transparent on the back layer. At this time, segments 2, 4, 6, and 8 may be set to opaque on the front layer.

At time 3, segments 1, 3, 7, and 9 may be set to be transparent on the back layer (making all of segments 1-9 transparent on the back layer), and segments 1, 3, 7, and 9 may be set to opaque on the front layer (making all of the segments 1-9 opaque on the front layer).

As illustrated in FIG. 3D, at each time point in the time sequence, additional segments may transition from being displayed on the back layer to being displayed on the front layer by controlling the opacity of the segments. The rippling illustrated in FIG. 3D starts at a specific location of the object (i.e., segment 5) and expands in multiple opposite directions. In some example, the opacity may be gradually changed on each of the layers between time points in the time sequence.

Figure 3E:
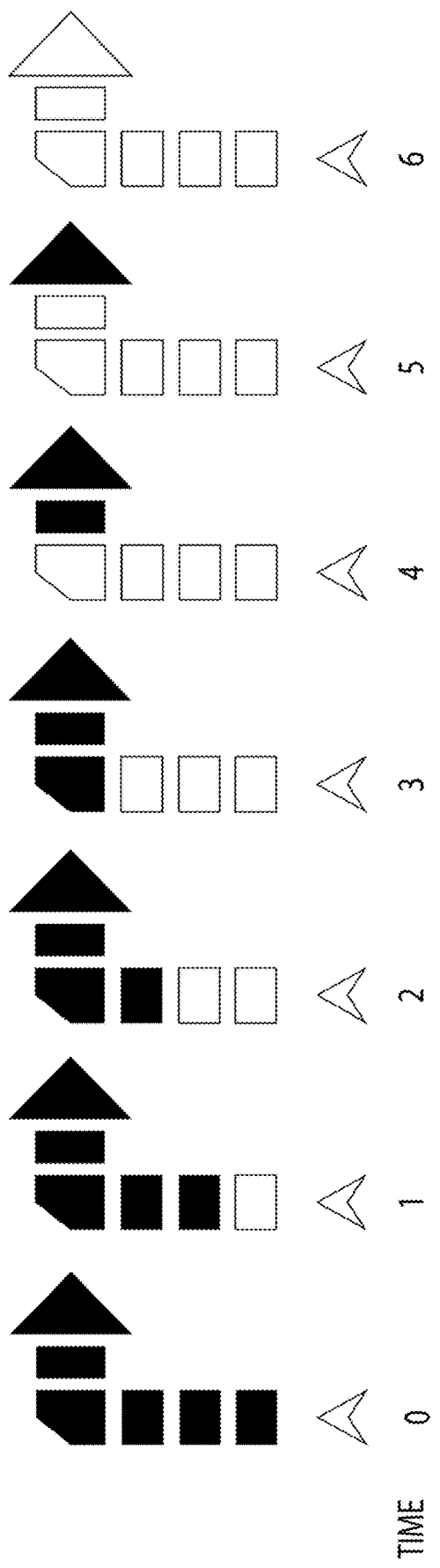

FIG. 3E illustrates an example embodiment of cluster depth rippling on two screens of an MLD system. As illustrated in FIG. 3E, the initial and final rendered objects (e.g., on the front or back layer) do not need to be connected to form the percept of a continuous surface (e.g. a dotted line). An exemplary embodiment of this may take the form of a navigation arrow indicating the next required turn being displayed as an arrow with attached dotted line. As the turn becomes imminent it may depth ripple across the layers from the point closest to the user's position on the screen to the end of the arrow, pulling the entire arrow to the front layer whilst also implying the forward and left/right motion required to correctly navigate.

As illustrated in FIG. 3E all segments of the arrow may be displayed on a back layer at time 0. At time 1, a lower segments may transition from being displayed on the back layer to being displayed on the front layer. At each subsequent time period additional segments may transition from the back display to the front display pulling the entire arrow to the front layer.

Figure 3F:
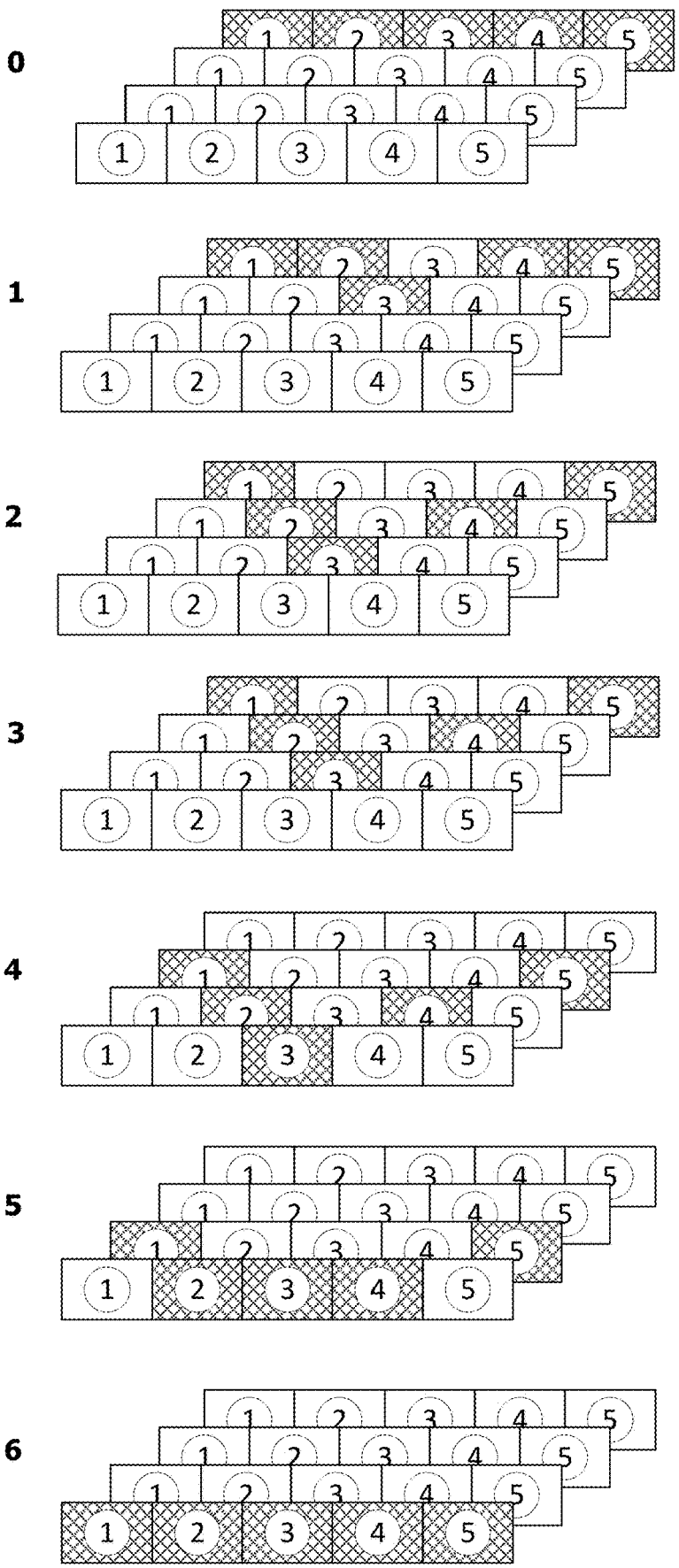

While FIGS. 3A-3E illustrate object rippling on two screens, exemplary embodiments can be applied to MLD systems including more than two screens. FIG. 3F illustrates bi-directional depth rippling on four screens of an MLD system according to a time sequence including seven time points. Increasing the number of adjacent displays over which content transitions using the depth rippling may increase the resolution of the ripple in the depth direction.

As illustrated in FIG. 3F, one or more segments are progressively moved between the front and rear screens using each of the four screens. At time 0, segments 1-5 may be displayed on the rear screen, while segments 1-5 on the other displays are set to be transparent. At time 1, segment 3 is moved from the rear screen to an adjacent screen. At time 2, segments 3 is moved to the next adjacent screen and segments 2 and 4 are moved from the rear screen to the adjacent screen. This process is repeated until all of the segments 1-5 are displayed on the front screen and segments 1-5 are made transparent in the other three screens.

Increasing the number of adjacent displays over which content transitions using the depth rippling may increase the resolution of the ripple in the depth direction.

In some example embodiments, object rippling may include controlling the opacity, size, and/or color of related segments as a function of time. For example, in some embodiments, opacity and/or color is changed to suggest that motion occurs between layers. In some embodiments, segments can be displayed concurrently on both layers with opacity and/or color adjustments to smooth out the transition. To help provide more visual cues for the depth motion the content within regions may utilize converging perspective lines aimed towards the transition space. The converging perspective lines may be animated to assist an observer to infer motion of individual segments across planes. In some examples the width, position, and/or scale of the segments, or elements drawn on segments, may be altered to bolster the illusion of continuous depth.

Figure 4:
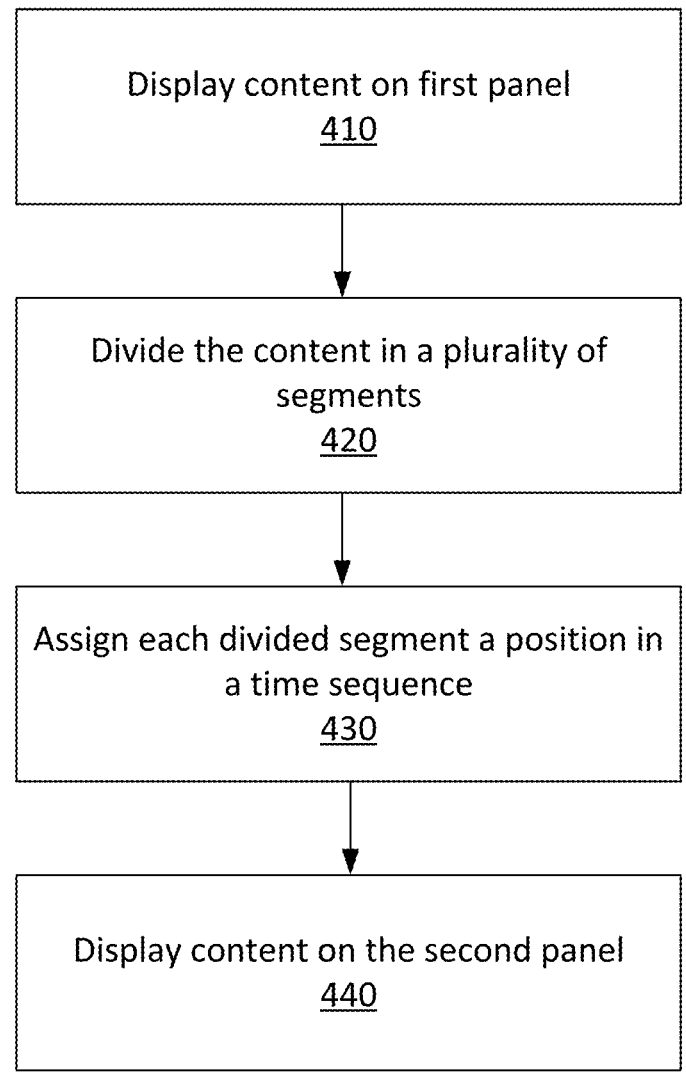
FIG. 4 illustrates a method for performing object rippling according to an embodiment of this disclosure.

FIG. 4 illustrates a method for performing object rippling according to an embodiment of this disclosure. The method may be performed by a processing system including at least one processor and memory. The method provides a technique by which a stacked series of discrete display planes (MLD) can imply a continuous slope of motion away from, or towards, the viewer via transitioning segments of planar regions across depth planes.

The method may include displaying content on a first panel 410, dividing the content into a plurality of segments 420, assigning each divided segment a position in a time sequence 430, and display content on the second panel 440. Displaying the content on the first and second display panel may include displaying the segments with an animation by varying optical properties of each segment on the first display panel and the second display panel according to a time for the respective segments specified by the time sequence. The animations may include controlling the opacity, size, and/or color of the segments.

FIGS. 5A-5I illustrate a sequence of an indicator relating to automatic cruise control according to an embodiment of this disclosure. While FIGS. 5A-5I are illustrated with reference to two display screens, similar processing may be applied to an MLD including additional screens (e.g., see MLD illustrated in FIG. 1) to move content from one screen to another screen via one or more other screens and/or to move content from a main screen to a plurality of screens provided on different sides of the main screen.

Figure 5A:
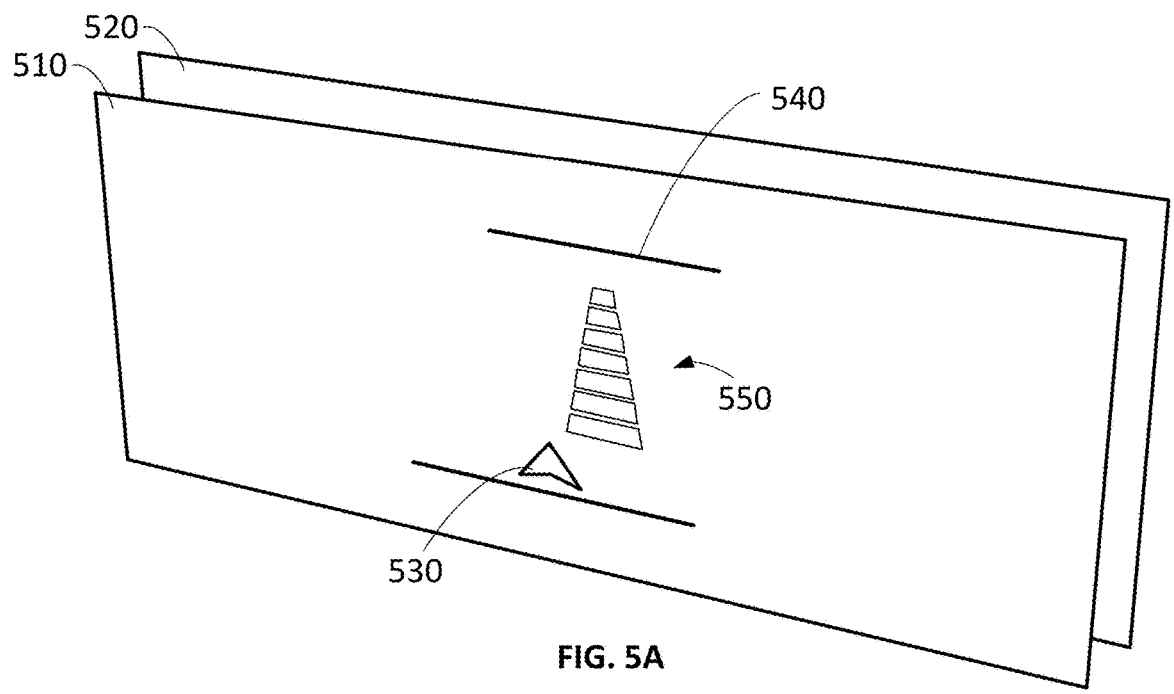
FIGS. 5A-5I illustrate a sequence of an indicator relating to automatic cruise control according to an embodiment of this disclosure.

FIG. 5A illustrates a front display 510 and a back display 520 arranged in a substantially parallel manner and the front display 510 overlapping the back display 520. Content is simultaneously displayed on the front display 510 and the back display 520 in a manner to give a perception of depth. A horizontal bar (e.g., towards the front of the viewer) and a triangle 530 are displayed on the front display 510. The horizontal bar and the triangle 530 may represent a viewer's car. A horizontal line 540 (displayed on the front display 510 and/or the back display 520) in the distance (away from the triangle 530) may represent a car the viewer is following.

A continuous, transparent, virtual ribbon may start on the front display 510 (e.g., near the horizontal bar and the triangle 530), extend across a portion of the front display 510, and continue to extend across a portion of the back display 520. The ribbon may be drawn partially on the front display and partially on the back display. A plurality of segments 550 illustrated as horizontal bars may be displayed in areas corresponding to the ribbon on the front display 510 and/or the back display 520. For safety, the viewer needs to understand the distance from the viewer's car (VC) to the car in front (CIF).

Figure 5B:
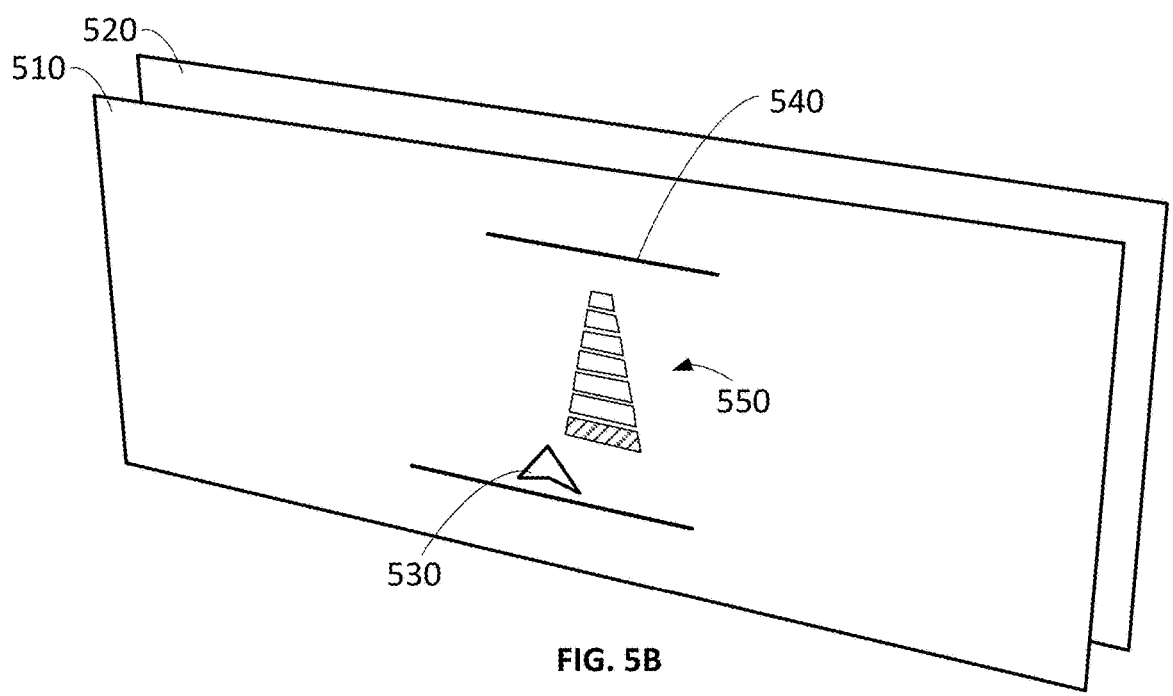
Figure 5C:
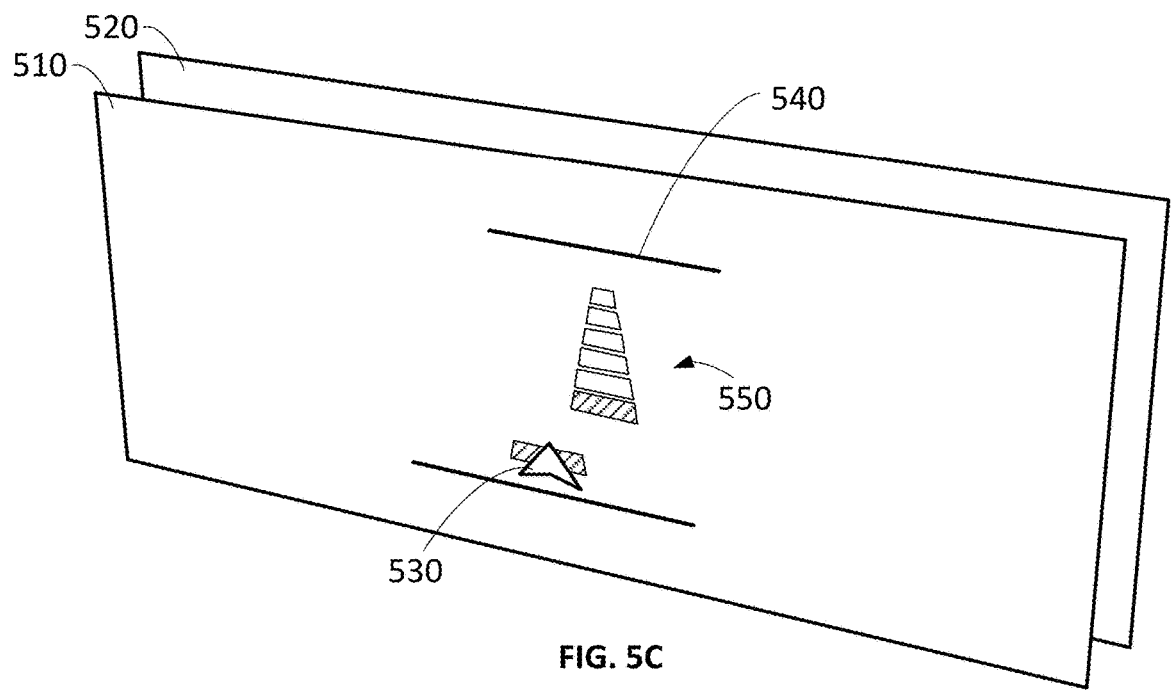
Figure 5D:
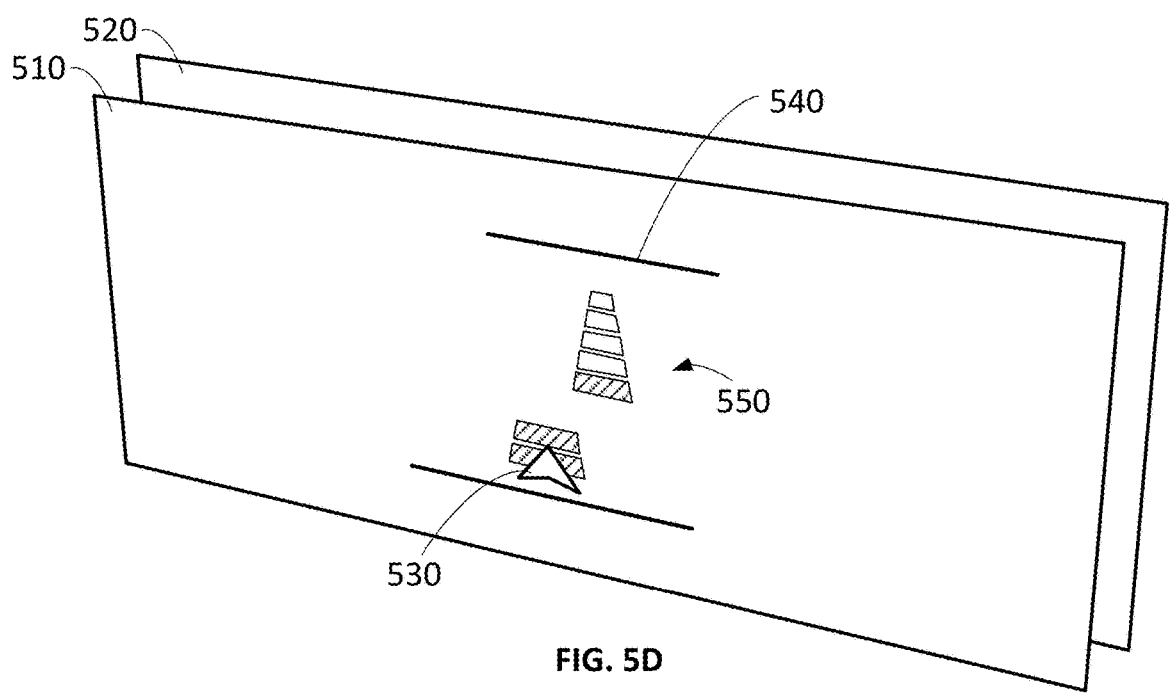
Figure 5E:
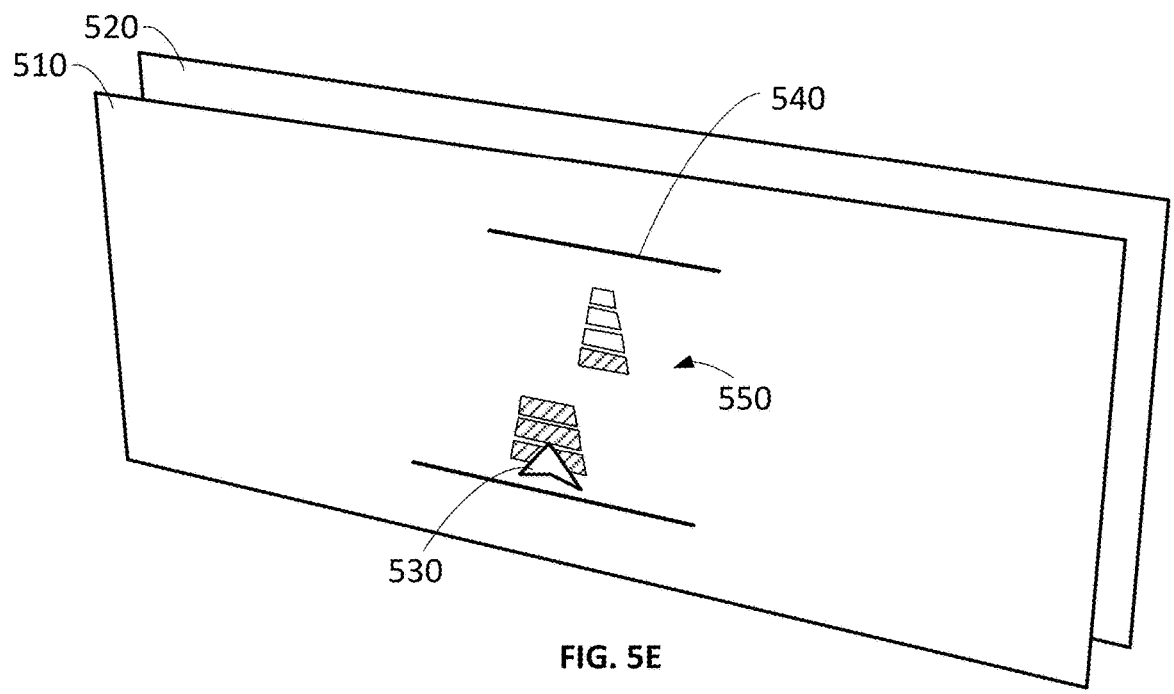
Figure 5F:
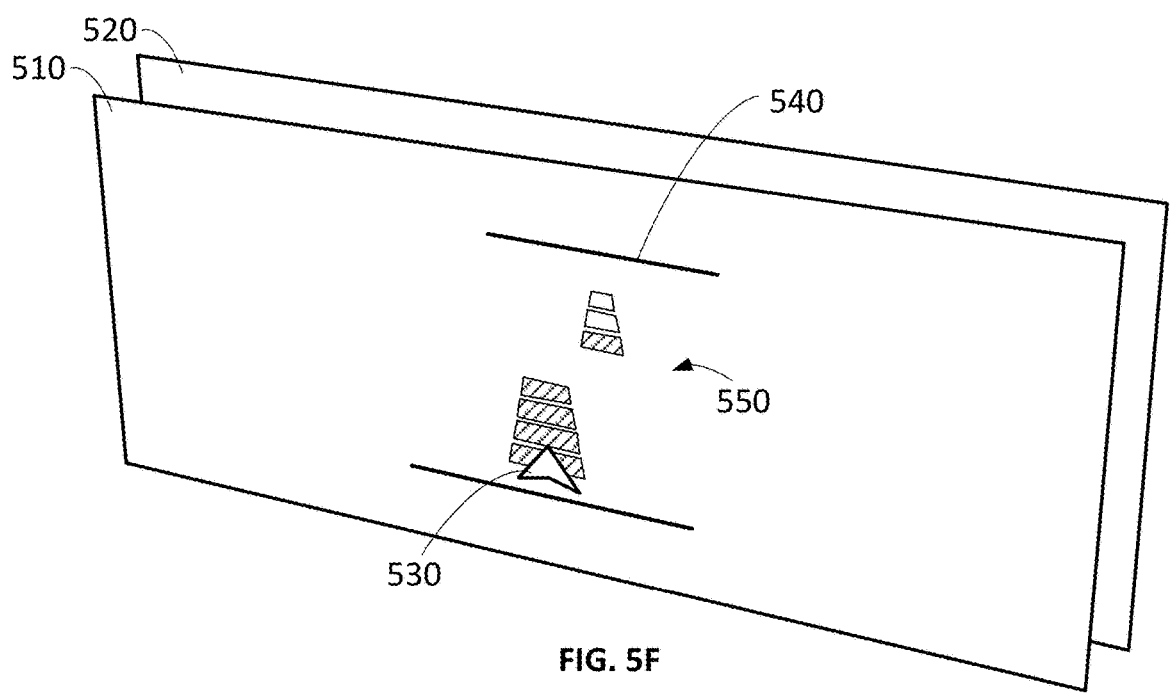
Figure 5G:
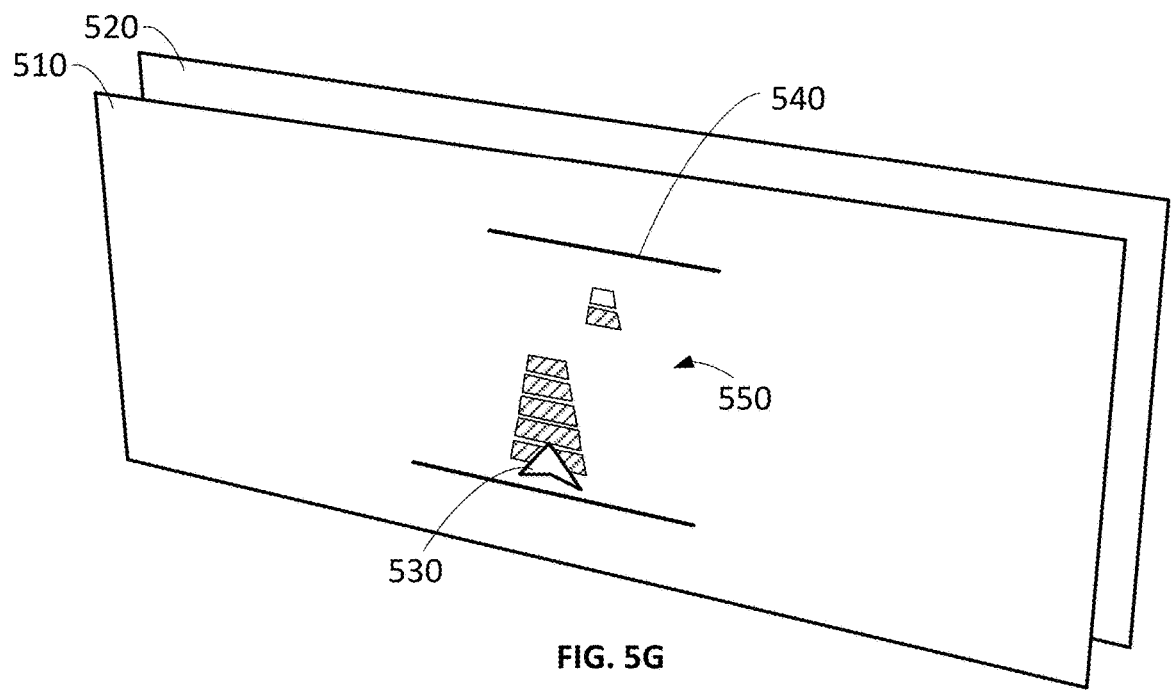
Figure 5H:
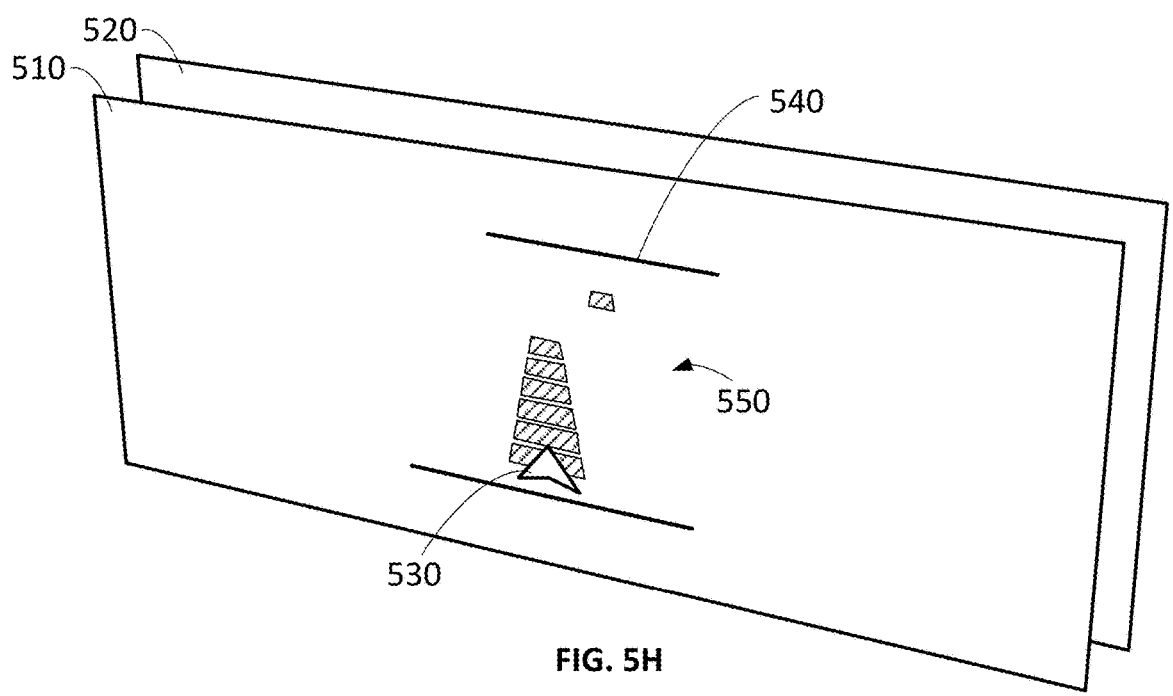

FIG. 5A illustrates the maximum distance between VC and the CIF. All of the virtual ribbon is placed on the back display 520 and as consequence all segments 550 including the horizontal bars are presented on the back display 520. FIG. 5C illustrates a short section of the ribbon pulled onto the front display 510. One horizontal bar is drawn on the front display behind the triangle 530 representing the VC. Before displaying one horizontal bar on the front display, the horizontal bar may be animated by changing one of its optical properties (e.g., color, brightness, opacity, size). In FIG. 5B this is illustrated with a different patter applied to the horizontal bar being fore moved to the front display 510.

As illustrated in FIGS. 5A-5I, the horizontal bars may be moved from the back display 520 to the front display 530 sequentially according to a timing assigned to each segment. The timing may be assigned in real time and/or be based on sensor data received from one or more sensors (e.g., a range sensor and/or speed sensor).

Figure 5I:
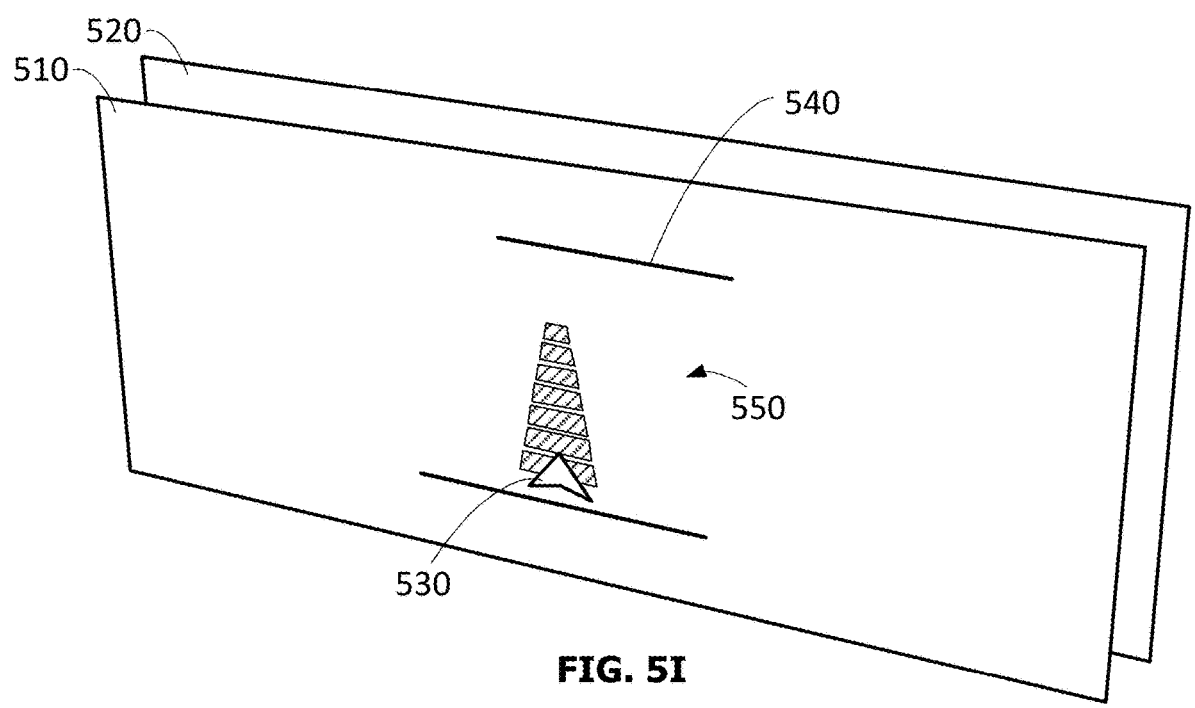

FIG. 5I illustrated an example of when the entire virtual ribbon is pulled onto the front display 510, and hence all the bars are pulled onto the front layer. As illustrated in FIGS. 5A-5I, the segments 550 may be displayed in a different manner (e.g., different color, size, shading, shape) at a time right before they are moved and/or after they are moved to the front display. In some embodiment, the transition of the segments between multiple displays may include moving the segment to the same corresponding position on the displays. In other embodiment, moving the segments between multiple displays may include shifting the position in one two directions.

Figure 6:
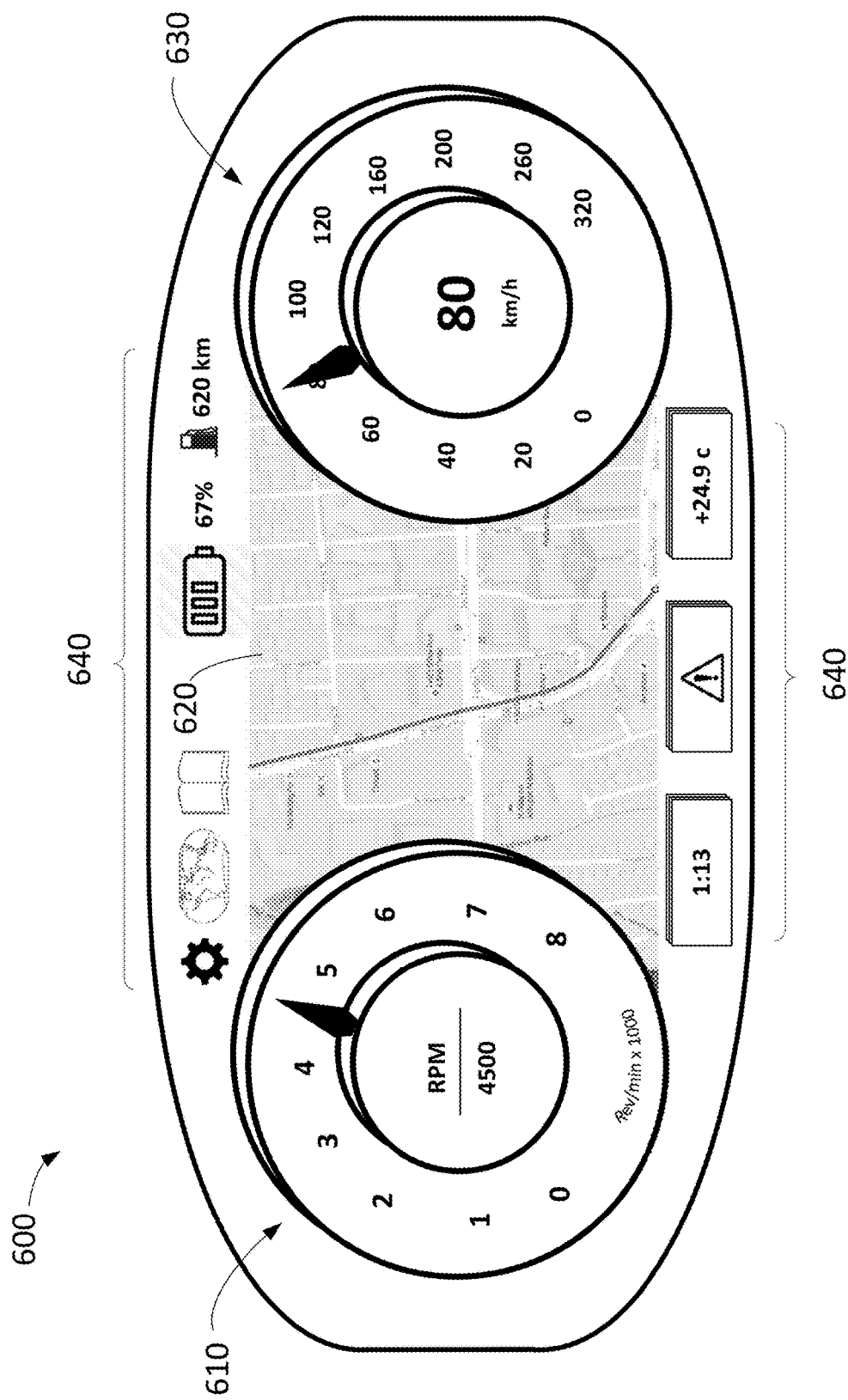
FIG. 6 illustrates a display of an instrument panel including an MLD system according to an embodiment of the present disclosure.

FIG. 6 illustrates a display of an instrument panel 600 including an MLD system according to an embodiment of the present disclosure. The instrument panel 600 may display content and move the content between different layers of the MLD system in accordance with one or more of the embodiments disclosed in this application. For example, rippling in accordance with one or more of the embodiments disclosed in this application can be used as an alert or to draw the a driver's attention to content displayed in the instrument panel 600.

The instrument panel 600 may display content simultaneously on different displays. The content may include a tachometer 610, navigation information 620, a speedometer 630, and other information 640. The other information may include vehicle temperature, fuel level, distance left before refueling, contact list, navigation settings, control settings, and warning information.

In some example embodiments, information may be moved from one display to another using rippling technique disclosed in this application. For example, in response to instructions, the tachometer 610 and/or the speedometer 630 may be moved between a front display and a back display. The instructions may be issued by the operator or in response to satisfying certain condition(s) (e.g., vehicle is put into drive mode or starts moving). In response to the instructions, segments of the tachometer 610 and/or the speedometer 630 may be moved sequentially between the displays according to the embodiments disclosed in this application. The speedometer 630 may be broken up into segments which include inner portion of the speedometer as one segment and outer portion of the speedometer as another segment. The current speed displayed in the center of the speedometer, the needle, and speed pointed to by the needle may each be set to a different segment. As discussed above, segments may transition gradually between the displays. In some examples, one or more segments (e.g., segments with text) may transition immediately upon reaching an assigned timing, while other segments may transition gradually over an assigned timing period.

In one example, the speedometer 630 may be moved from a rear display to a front display using the rippling technique when a determination is made that the speed of the vehicle exceeds the speed limit at current location of the vehicle, exceed the speed limit at current location of the vehicle by a preset limit, or exceeds a preset limit. The speedometer 630 may be moved back to the rear display from the front display using the rippling technique when a determination is made that the speed of the vehicle is below the speed limit at present location of the vehicle, does not exceed the speed limit at current location of the vehicle by a preset limit, is below a preset limit, or after a predetermined time period.

If an object (e.g., speedometer 630) is displayed using a plurality of displays to provide a perception of depth, the object may still be moved from a first set of display screens to a second set of display screens according to the embodiments disclosed in this application. For example, the speedometer 630 which is displayed using three displays of an MLD system, portions of the speedometer 630 may be moved in a manner such that all portions of the speedometer are displayed on a single screen according to the various embodiments disclosed in this application.

In another example, the navigation information may transition between multiple displays to alert the driver to something. The processing system may display navigation information on a back display and in response to instructions (e.g., a user input or determining that vehicle is approaching location of a turn), move the navigation information to a front display. Moving the navigation information to the front display may include dividing the navigation information into a plurality of segments, assigning each divided segment a position in a time sequence, and moved the divided segments to the front display with an animation that varies the optical properties of each segment on the first display panel and the second display panel according to a time for the respective segments specified by the time sequence. The navigation information may be divided in real time at the time of the instructions based on the navigation information currently displayed. In one example, major roads and/or selected navigation route may be a single segment which is set to move to the front screen before other roads and/or landmarks in the navigation information is moved. In other examples, the navigation information may be broken up into horizontal bars (as illustrated in FIG. 5) and the horizontal bars may be moved between the displays in a sequential order.

Figure 7:
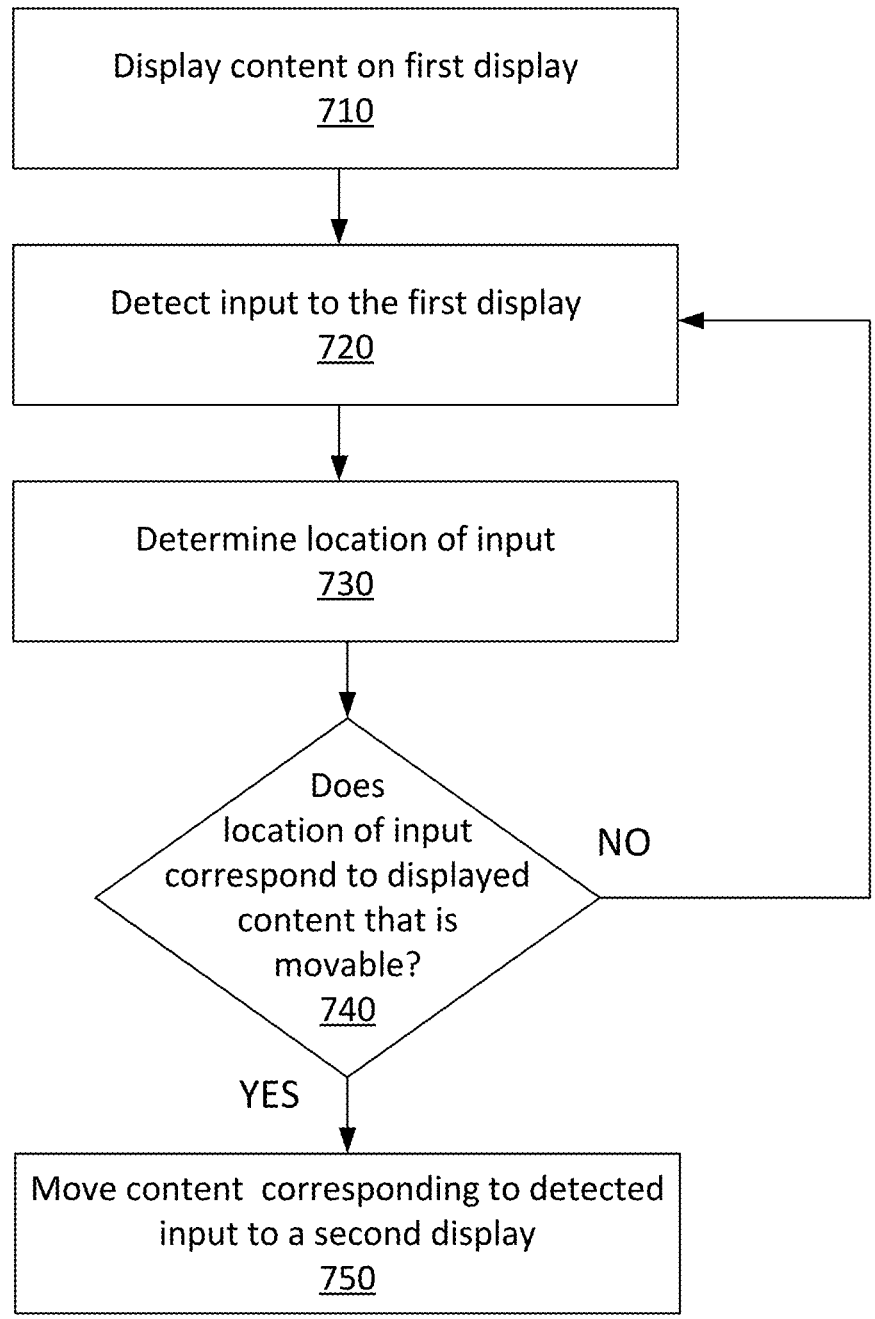
FIG. 7 illustrates a method for controlling the display of content according to an embodiment of the present disclosure.

FIG. 7 illustrates a method for controlling the display of content according to an embodiment of the present disclosure. The content may be displayed on a multi-layer display system including a plurality of display screens provided in an overlapping manner. The method may include displaying content on a first display screen 710. The content may include text, images and a plurality of buttons. While the content is displayed on the first display screen 710, an input may be detected 720 and the location of the input may be determined 730. When the location of the input corresponds to a displayed content that is movable to another display (YES in step 740), the content corresponding to the detected input may be moved to a second display screen 750 according to embodiments of this disclosure. Whether content is movable may be designated by a flag assigned to the content.

The first display screen displaying the content may overlap one or more other display screens of the multi-layer display system. The first display screen may be a touch sensitive display and/or may include a proximity detector. The input may be detected based on data received from the touch sensitive display and/or from the proximity detector. The input may be a touch input to the touch sensitive display. In another embodiment, the input may be hovering of an object (e.g., a finger or a stylus) near the surface of the first display screen. Detecting the input may include detecting whether the input is received for a predetermined period of time. Thus, if the input is stopped or substantially modified before the predetermined period of time passes after the input is received, the input may be disregarded.

Determining whether the input corresponds to content that is movable may include determining a location of the input (e.g., location of the touch input or location of where an object is hovered) on the first display screen. If the determined location of the input corresponds to the location on the content that is movable, the content may be divided into segments, the divided segments may be assigned a position in a time sequence, and the divided segments may be moved from the first display to the second display based on timing assigned to the segments. Moving the selected content between the displays may include displaying the segments with an animation by varying optical properties of each segment on the first display and the second display according to a time for the respective segments specified by the time sequence. The animations may include controlling the opacity, size, and/or color of the segments.

In one embodiment, the displayed content on the second display screen may be moved back to the first display screen when another input is made or the first input is terminated (e.g., when touch input is removed or when finger is moved out of a predetermined region). The content may be moved back to the first display screen in a similar manner that it was moved to the second display screen.

In some embodiments, the location of the touch input may be used to determine timing of the segments for the transition. For example, if a user input is received on one end of an object, the segments of the object may be set to a timing such that the segments closer to the touch input transition to the other display sooner. In another embodiment, if a user input is received in the middle of an object, the segments of the object may be set to a timing such that the segment closest to the touch input transition to the other display first and one or more segments adjacent to the first segment transition after the first segment. In this example, two segments adjacent on two sides of the first segment, may transition between the displays simultaneously at a subsequent timing.

In some embodiments, the location of the touch input may be used to determine segments of the content. For example, the location of the user input on displayed content (e.g., a specific location on a navigation map) may define the first segment, with the subsequent segments extending outwardly from the first input. In this example, a first segment may correspond to a circle at the location of the input, a second segment may correspond to a circular ring around the first segment, and a third segment may correspond to a circular ring around the second segment.

Figure 8:
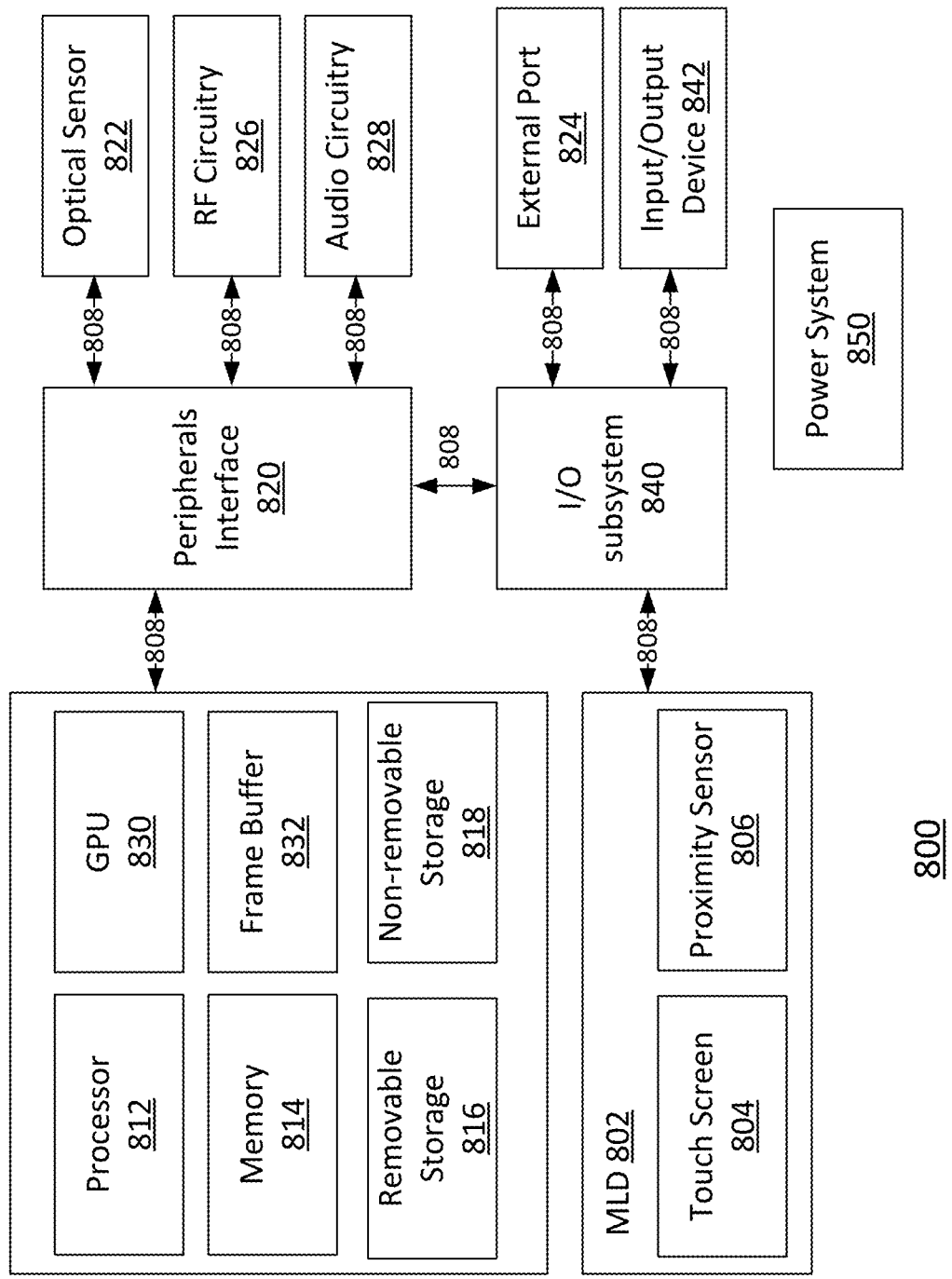
FIG. 8 illustrates an exemplary processing system upon which various embodiments of the present disclosure(s) may be implemented.

FIG. 8 illustrates an exemplary system 800 upon which embodiments of the present disclosure(s) may be implemented. The system 800 may be a portable electronic device that is commonly housed, but is not so limited. The system 800 may include a multi-layer display 802 including a plurality of overlapping displays. The multi-layer system may include a touch screen 804 and/or a proximity detector 806. The various components in the system 800 may be coupled to each other and/or to a processing system by one or more communication buses or signal lines 808.

The multi-layer display 802 may be coupled to a processing system including one or more processors 812 and memory 814. The processor 812 may comprise a central processing unit (CPU) or other type of processor. Depending on the configuration and/or type of computer system environment, the memory 814 may comprise volatile memory (e.g., RAM), non-volatile memory (e.g., ROM, flash memory, etc.), or some combination of the two. Additionally, memory 814 may be removable, non-removable, etc.

In other embodiments, the processing system may comprise additional storage (e.g., removable storage 816, non-removable storage 818, etc.). Removable storage 816 and/or non-removable storage 818 may comprise volatile memory, non-volatile memory, or any combination thereof. Additionally, removable storage 816 and/or non-removable storage 818 may comprise CD-ROM, digital versatile disks (DVD) or other optical storage, magnetic cassettes, magnetic tape, magnetic disk storage or other magnetic storage devices, or any other medium which can be used to store information for access by processing system.

As illustrated in FIG. 8, the processing system may communicate with other systems, components, or devices via peripherals interface 820. Peripherals interface 820 may communicate with an optical sensor 822, external port 824, RC circuitry 826, audio circuitry 828 and/or other devices. The optical sensor 882 may be a CMOS or CCD image sensor. The RC circuitry 826 may be coupled to an antenna and allow communication with other devices, computers and/or servers using wireless and/or wired networks. The system 800 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), BLUETOOTH (BLUETOOTH is a registered trademark of Bluetooth Sig, Inc.), Wi-MAX, a protocol for email, instant messaging, and/or a short message service (SMS), or any other suitable communication protocol, including communication protocols not yet developed as of the filing date of this document. In an exemplary embodiment, the system 800 may be, at least in part, a mobile phone (e.g., a cellular telephone) or a tablet.

A graphics processor 830 may perform graphics/image processing operations on data stored in a frame buffer 832 or another memory of the processing system. Data stored in frame buffer 832 may be accessed, processed, and/or modified by components (e.g., graphics processor 830, processor 812, etc.) of the processing system and/or components of other systems/devices. Additionally, the data may be accessed (e.g., by graphics processor 830) and displayed on an output device coupled to the processing system. Accordingly, memory 814, removable 816, non-removable storage 818, frame buffer 832, or a combination thereof, may comprise instructions that when executed on a processor (e.g., 812, 830, etc.) implement a method of processing data (e.g., stored in frame buffer 832) for improved display quality on a display.

The memory 814 may include one or more applications. Examples of applications that may be stored in memory 814 include, navigation applications, telephone applications, email applications, text messaging or instant messaging applications, memo pad applications, address books or contact lists, calendars, picture taking and management applications, and music playing and management applications. The applications may include a web browser for rendering pages written in the Hypertext Markup Language (HTML), Wireless Markup Language (WML), or other languages suitable for composing webpages or other online content. The applications may include a program for browsing files stored in memory.

The memory 814 may include a contact point module (or a set of instructions), a closest link module (or a set of instructions), and a link information module (or a set of instructions). The contact point module may determine the centroid or some other reference point in a contact area formed by contact on the touch screen. The closest link module may determine a link that satisfies one or more predefined criteria with respect to a point in a contact area as determined by the contact point module. The link information module may retrieve and display information associated with selected content.

Each of the above identified modules and applications may correspond to a set of instructions for performing one or more functions described above. These modules (i.e., sets of instructions) need not be implemented as separate software programs, procedures or modules. The various modules and sub-modules may be rearranged and/or combined. Memory 814 may include additional modules and/or sub-modules, or fewer modules and/or sub-modules. Memory 814, therefore, may include a subset or a superset of the above identified modules and/or sub-modules. Various functions of the system may be implemented in hardware and/or in software, including in one or more signal processing and/or application specific integrated circuits.

Memory 814 may store an operating system, such as Darwin, RTXC, LINUX, UNIX, OS X, WINDOWS, or an embedded operating system such as VxWorks. The operating system may include procedures (or sets of instructions) for handling basic system services and for performing hardware dependent tasks. Memory 814 may also store communication procedures (or sets of instructions) in a communication module. The communication procedures may be used for communicating with one or more additional devices, one or more computers and/or one or more servers.

The memory 814 may include a display module (or a set of instructions), a contact/motion module (or a set of instructions) to determine one or more points of contact and/or their movement, and a graphics module (or a set of instructions). The graphics module may support widgets, that is, modules or applications with embedded graphics. The widgets may be implemented using JavaScript, HTML, Adobe Flash, or other suitable computer program languages and technologies.

An I/O subsystem 840 may include a touch screen controller, a proximity controller and/or other input/output controller(s). The touch-screen controller may be coupled to a touch-sensitive screen or touch sensitive display system. The touch screen and touch screen controller may detect contact and any movement or break thereof using any of a plurality of touch sensitivity technologies now known or later developed, including but not limited to capacitive, resistive, infrared, and surface acoustic wave technologies, as well as other proximity sensor arrays or other elements for determining one or more points of contact with the touch-sensitive screen. A touch-sensitive display in some embodiments of the display system may be analogous to the multi-touch sensitive screens.

The other input/output controller(s) may be coupled to other input/control devices 842, such as one or more buttons. In some alternative embodiments, input controller(s) may be coupled to any (or none) of the following: a keyboard, infrared port, USB port, and/or a pointer device such as a mouse. The one or more buttons (not shown) may include an up/down button for volume control of the speaker and/or the microphone. The one or more buttons (not shown) may include a push button. The user may be able to customize a functionality of one or more of the buttons. The touch screen may be used to implement virtual or soft buttons and/or one or more keyboards.

In some embodiments, the system 800 may include circuitry for supporting a location determining capability, such as that provided by the Global Positioning System (GPS). The system 800 may include a power system 850 for powering the various components. The power system 850 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The system 800 may also include one or more external ports 824 for connecting the system 800 to other devices.

Portions of the present invention may be comprised of computer-readable and computer-executable instructions that reside, for example, in a processing system and which may be used as a part of a general purpose computer network (not shown). It is appreciated that processing system is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure.

The invention claimed is:

1. An instrument panel comprising:
a multi-layer display including a first display panel and second display panel arranged in a substantially parallel manner, the front display panel and the rear display panel including an array of pixels and the second display panel overlapping the first display panel;
a backlight configured to provide light to the first display panel and the second display panel of the multi-layer display system; and
a processing system comprising at least one processor and memory, the processing system configured to:
display content including an object on a first display panel;
divide the object into a plurality of segments;
assign to each divided segment a position in a time sequence; and
responsive to instructions, display, on the second display panel, segments corresponding to the segments of the object displayed on the first display panel, wherein the segments displayed on the first and second display panel are animated by varying optical properties of each segment according to the positions assigned the segments in the time sequence;
wherein the first display panel comprises a touch sensitive display, and the processing system is further configured to detect whether a touch input is performed to a portion of the first display panel displaying the object, and upon determining that the input is performed, provide instructions to start displaying the segments on the second display panel according to the position in the time sequence assigned to corresponding segments displayed on the first display panel.

2. The instrument panel of claim 1, wherein the processing system is configured so that segments of the object displayed on the first display panel and corresponding segments displayed on the second panel appear to be the same object.

3. The instrument panel of claim 1, wherein varying the optical properties of the segments displayed on the first display panel includes reducing the opacity of the segments displayed on the first display panel, and varying the optical properties of the segments displayed on the second display panel includes increasing the opacity of the segments displayed on the second display panel.

4. The instrument panel of claim 1, wherein varying the optical properties of the segments displayed on the first display panel includes gradually decreasing the visibility of the segments displayed on the first display panel, and varying the optical properties of the segments displayed on the second display panel includes gradually increasing the visibility of the segments displayed on the second display panel.

5. A multi-layer display system comprising:
a first display panel and second display panel arranged in a substantially parallel manner, the second display panel overlapping the first display panel;
a backlight configured to provide light to the first display panel and the second display panel of the multi-layer display system; and
a processing system comprising at least one processor and memory, the processing system configured to:
display a first object on a first display panel, the first object divided into a plurality of segments, each segment assigned a position in a time sequence;
responsive to instructions, display a second object on the second display panel, the second object including a plurality of segments corresponding to the segments of the first object, wherein the segments of the first object and segments of the second object are animated by varying optical properties of each segment on the first display panel and the second display panel according to times assigned to the segments of the first object in the time sequence, wherein such times assigned are dependent on adjacency matrices; and
wherein the segments of the first object are to be removed from being displayed on the first display panel according to the time assigned in the time sequence to each segment of the first object, and the segments of the second object are to be added to being displayed on the second display panel according to the time assigned in the time sequence assigned to each segment of the second object.

6. The multi-layer display system of claim 5, wherein the first object and the second object have the same shape and size.

7. The multi-layer display system of claim 5, wherein for each segment of the first object removed from being displayed on the first display panel, a corresponding segment of the second object is displayed on the second display panel.

8. The multi-layer display system of claim 7, wherein the segments of the first object are removed from being displayed on the first display panel by reducing the opacity of the segments of the first object, and the segments of the second object are displayed on the second display panel by increasing the opacity of the segments of the second object.

9. The multi-layer display system of claim 5, wherein the first display panel is a touch sensitive display, and the processing system is configured to detect whether a touch input is performed to a portion of the first display panel displaying the first object, and
upon determining that the input is performed to the portion of the first display panel displaying the first object, provide instructions to display the second object on the second display panel.

10. The multi-layer display system of claim 5, wherein the segments of the first object are separated by gaps between the segments.

11. The multi-layer display system of claim 5, wherein the segments of the first object form a continuous object.

12. A multi-layer display system comprising:
a first display panel and second display panel, the second display panel at least partially overlapping the first display panel;
a backlight configured to provide light to the first display panel and the second display panel of the multi-layer display system; and
a processing system comprising at least one processor and memory, the processing system configured to:
display a first object on a first display panel, the first object divided into a plurality of segments, each segment assigned a position in a time sequence;
responsive to instructions, display a second object on the second display panel, the second object including a plurality of segments corresponding to the segments of the first object, wherein the segments of the first object and segments of the second object are animated by varying optical properties of each segment on the first display panel and the second display panel according to times assigned to the segments of the first object in the time sequence, wherein such times assigned are dependent on adjacency matrices; and wherein the first object and the second object indicate a distance between two vehicles.

13. A method for displaying content on a multi-layer display system including at least first display panel and second display panel arranged in a substantially parallel and overlapping manner, the method comprising:

displaying a first object on a first display panel, the first object divided into a plurality of segments, each segment assigned a position in a time sequence;

responsive to instructions, display a second object on the second display panel, the second object including a plurality of segments corresponding to the segments of the first object, wherein the segments of the first object and segments of the second object are animated by varying optical properties of each segment on the first display panel and the second display panel according to times assigned to the segments of the first object in the time sequence; and wherein the segments of the first object are removed from being displayed on the first display panel according to the time assigned in the time sequence to each segment of the first object, and the segments of the second object are added to being displayed on the second display panel according to the time assigned in the time sequence assigned to each segment of the second object.

14. The method of claim 13, wherein for each segment of the first object removed from being displayed on the first display panel, a corresponding segment of the second object is displayed on the second display panel.

15. The method of claim 14, wherein the segments of the first object are removed from being displayed on the first display panel by reducing the opacity of the segments of the first object, and the segments of the second object are displayed on the second display panel by increasing the opacity of the segments of the second object.

16. A display system comprising:

a multi-layer display including a plurality of display panels, each display panel including an array of pixels;

a backlight configured to provide light to the plurality of display panels; and a processing system comprising at least one processor and memory, the processing system configured to:

divide an object for display on the display panels into a plurality of segments;

assign to each divided segment a position in a time sequence;

control a first panel of the plurality of display panels to display the object including the plurality of segments;

control the plurality of display panels to move the segments from the first display panel to a second panel of the plurality of display panels via one or more other display panels of the plurality of display panels disposed between the first display panel and the second display panel; and wherein the first display panel is a touch sensitive display, and the method further includes determining whether a touch input is performed to a portion of the first display panel displaying the first object, and upon determining that the input is performed to the portion of the first display panel displaying the first object, provide instructions to display the second object on the second display panel.

17. A display system comprising:

a multi-layer display including a plurality of display panels, each display panel including an array of pixels;

a backlight configured to provide light to the plurality of display panels; and a processing system comprising at least one processor and memory, the processing system configured to:

divide an object for display on the display panels into a plurality of segments;

assign to each divided segment a position in a time sequence;

control a first panel of the plurality of display panels to display the object including the plurality of segments;

control the plurality of display panels to move the segments from the first display panel to a second panel of the plurality of display panels via one or more other display panels of the plurality of display panels disposed between the first display panel and the second display panel; and responsive to a touch input to the portion of the first display panel displaying the first object, divide the first object into the plurality of segments based on the position of the touch input.

* * * * *